United States Patent
Schneider et al.

(10) Patent No.: US 9,755,835 B2
(45) Date of Patent: Sep. 5, 2017

(54) METADATA TRANSCODING

(71) Applicants: DOLBY LABORATORIES LICENSING CORPORATION, San Francisco, CA (US); DOLBY INTERNATIONAL AB, Amsterdam Zuidoost (NL)

(72) Inventors: Andreas Schneider, Fuerth (DE); Christof Fersch, Neumarkt (DE); Martin Wolters, Nuremberg (DE); Jeffrey Riedmiller, Penngrove, CA (US); Scott Gregory Norcross, San Rafael, CA (US); Michael Grant, San Francisco, CA (US)

(73) Assignees: Dolby Laboratories Licensing Corporation, San Francisco, CA (US); Dolby International AB, Amsterdam Zuidoost (NL)

( * ) Notice: Subject to any disclaimer, the term of this patent is extended or adjusted under 35 U.S.C. 154(b) by 0 days.

(21) Appl. No.: 14/761,892

(22) PCT Filed: Jan. 15, 2014

(86) PCT No.: PCT/US2014/011695
§ 371 (c)(1),
(2) Date: Jul. 17, 2015

(87) PCT Pub. No.: WO2014/113478
PCT Pub. Date: Jul. 24, 2014

(65) Prior Publication Data
US 2015/0372820 A1    Dec. 24, 2015

Related U.S. Application Data

(60) Provisional application No. 61/754,893, filed on Jan. 21, 2013.

(51) Int. Cl.
H04L 9/32 (2006.01)
H04L 29/06 (2006.01)
(Continued)

(52) U.S. Cl.
CPC .......... H04L 9/3242 (2013.01); G10L 19/173 (2013.01); H04H 60/73 (2013.01);
(Continued)

(58) Field of Classification Search
CPC . H04L 9/3242; H04L 65/4084; H04L 65/607; H04L 65/605; H04N 19/40;
(Continued)

(56) References Cited

U.S. PATENT DOCUMENTS 5,940,591 A    8/1999  Boyle
7,656,948 B2   2/2010  Seong
(Continued)

FOREIGN PATENT DOCUMENTS

EP    1213720    6/2002
EP    1349080    10/2003
(Continued)

OTHER PUBLICATIONS

Schildbach, W. et al "Transcoding of Dynamic Range Control Coefficients and Other Metadata into MPEG-4 HEAAC" 123rd Audio Engineering Society, Oct. 1, 2007.
(Continued)

*Primary Examiner* — Michael Pyzocha

(57) ABSTRACT

The present document relates to transcoding of metadata, and in particular to a method and system for transcoding metadata with reduced computational complexity. A transcoder configured to transcode an inbound bitstream comprising an inbound content frame and an associated inbound metadata frame into an outbound bitstream comprising an outbound content frame and an associated out-
(Continued)

bound metadata frame is described. The inbound content frame is indicative of a signal encoded according to a first codec system and the outbound content frame is indicative of the signal encoded according to a second codec system. The transcoder is configured to identify an inbound block of metadata from the inbound metadata frame, the inbound block of metadata associated with an inbound descriptor indicative of one or more properties of metadata comprised within the inbound block of metadata, and to generate the outbound metadata frame from the inbound metadata frame based on the inbound descriptor.

18 Claims, 8 Drawing Sheets

(51) Int. Cl.
| | |
|---|---|
| *H04N 19/40* | (2014.01) |
| *H04N 21/235* | (2011.01) |
| *H04N 21/435* | (2011.01) |
| *H04H 60/73* | (2008.01) |
| *G10L 19/16* | (2013.01) |

(52) U.S. Cl.
CPC ........ *H04L 65/4084* (2013.01); *H04L 65/605* (2013.01); *H04L 65/607* (2013.01); *H04N 19/40* (2014.11); *H04N 21/2355* (2013.01); *H04N 21/4355* (2013.01)

(58) Field of Classification Search
CPC ........... H04N 21/2355; H04N 21/4355; H04H 60/73; G10L 19/173
See application file for complete search history.

(56) References Cited

U.S. PATENT DOCUMENTS

| | | | |
|---|---|---|---|
| 7,913,277 | B1 | 3/2011 | Rahrer |
| 8,798,776 | B2 | 8/2014 | Schildbach |
| 2003/0123701 | A1 | 7/2003 | Dorrell |
| 2003/0126432 | A1 | 7/2003 | Tonisson |
| 2004/0028227 | A1* | 2/2004 | Yu ...................... H04L 63/0428 380/201 |
| 2005/0050345 | A1* | 3/2005 | Dowdy .................. G06F 21/10 713/193 |
| 2006/0005031 | A1* | 1/2006 | Apostolopoulos .... H04L 9/0637 713/179 |
| 2006/0242325 | A1* | 10/2006 | Ramaswamy ......... H04H 20/95 709/246 |
| 2007/0074020 | A1* | 3/2007 | Nishimura ........ G06F 17/30038 713/168 |
| 2009/0125315 | A1 | 5/2009 | Koishida |
| 2010/0146287 | A1* | 6/2010 | Kreiner .................... H04L 63/12 713/178 |
| 2010/0205162 | A1 | 8/2010 | Davis |
| 2011/0069661 | A1* | 3/2011 | Waytena, Jr. ......... H04L 63/102 370/328 |
| 2011/0264676 | A1 | 10/2011 | Belan |
| 2012/0038782 | A1 | 2/2012 | Messmer |
| 2012/0128151 | A1* | 5/2012 | Boehm ................. H04L 65/602 380/42 |
| 2012/0185693 | A1* | 7/2012 | Chen ................ H04N 21/41407 713/168 |
| 2013/0246077 | A1* | 9/2013 | Riedmiller ............ G10L 19/008 704/500 |

FOREIGN PATENT DOCUMENTS

| | | |
|---|---|---|
| GB | 2387287 | 10/2003 |
| JP | H08-297638 | 11/1996 |
| JP | 2006-518049 | 8/2006 |
| JP | 2008-011535 | 1/2008 |
| JP | 2010-003256 | 1/2010 |
| JP | 2010-537467 | 12/2010 |
| RU | 2419245 | 5/2011 |
| WO | 2004/061699 | 7/2004 |
| WO | 2006/118896 | 11/2006 |
| WO | 2010/039441 | 4/2010 |
| WO | 2011/009088 | 1/2011 |
| WO | 2011/015369 | 2/2011 |
| WO | 2011/145353 | 11/2011 |
| WO | 2012/061340 | 5/2012 |

OTHER PUBLICATIONS

Mukherjee, D. et al "A Framework for Full Format-Independent Adaptation of Scalable Bit Streams" IEEE Transactions on Circuits and Systems for Video Technology, vol. 15, Issue 10, pp. 1280-1290, Oct. 2005.

Cossette, S.G. et al "New Techniques for Audio Metadata Use and Distribution", Proceeding of the Audio Engineering Convention Society, AES 117th, vol. 117, Sep. 24, 1999, pp. 1-11.

EBU-TECH 3285 "Specification of the Broadcast Wave Format; a format for Audio Data Files" Supplement 6: Dolby Metadata, Oct. 1, 2009.

Yuan-Chi Chang, et al "Secure Transcoding of Internet Content" JCIS, 2002, pp. 940-943.

* cited by examiner

FIG. 6
| FIG. 6A | FIG. 6B |
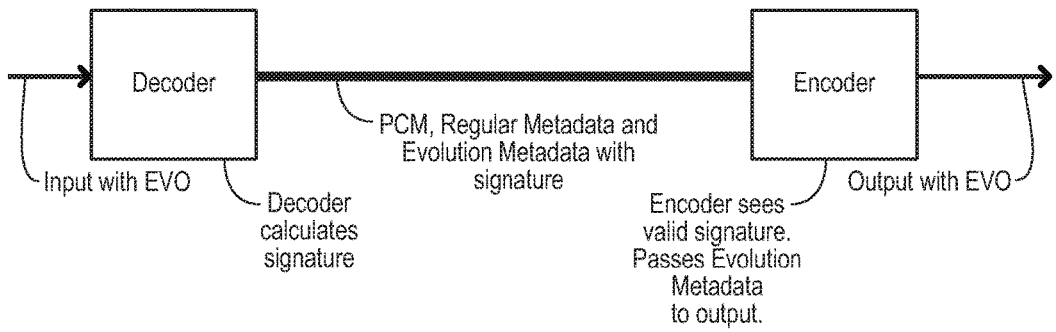
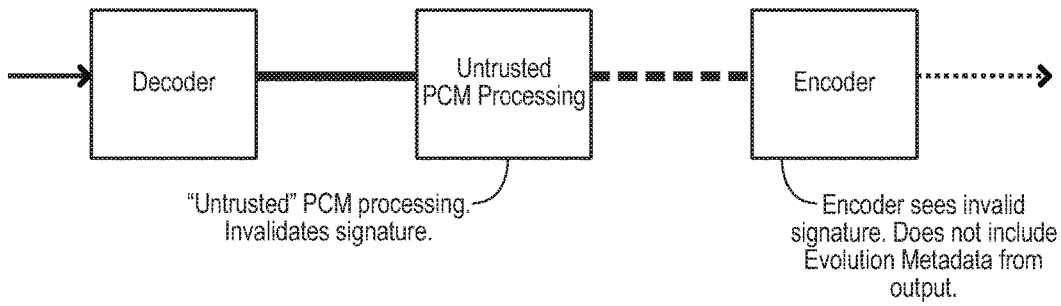
FIG. 6A

METADATA TRANSCODING

CROSS-REFERENCE TO RELATED APPLICATIONS

This application claims priority to U.S. Provisional Patent Application No. 61/754,893, filed on 21 Jan. 2013, which is hereby incorporated by reference in its entirety.

TECHNICAL FIELD

The present document relates the transcoding of metadata. In particular, the present document relates to a method and system for transcoding metadata with reduced computational complexity.

BACKGROUND

Various single-channel and/or multi-channel audio rendering systems such as 5.1, 7.1 or 9.1 multi-channel audio rendering systems are currently in use. The audio rendering systems allow e.g. for the generation of a surround sound originating from 5+1, 7+1 or 9+1 speaker locations, respectively. For an efficient transmission or for an efficient storing of the corresponding single-channel or multi-channel audio signals, audio codec (encoder/decoder) systems such as Dolby Digital (DD) or Dolby Digital Plus (DD+) are being used.

There may be a significant installed base of audio rendering devices which are configured to decode audio signals which have been encoded using a particular audio codec system (e.g. Dolby Digital). The particular audio codec system may be e.g. referred to as a second audio codec. On the other hand, the evolution of audio codec systems may lead to an updated audio codec system (e.g. Dolby Digital Plus), which may be e.g. referred to as a first audio codec system. The updated audio codec system may provide additional features (e.g. an increased number of channels) and/or improved coding quality. As such, content providers may be inclined to provide their content in accordance to the updated audio codec system.

Nevertheless, the user having audio rendering device with a decoder of the second audio codec system should still be able to render the audio content which has been encoded in accordance to the first audio codec system. This may be achieved by a so called transcoder or converter which is configured to convert the audio content which is encoded in accordance to the first audio codec system into modified audio content which is encoded in accordance to the second audio codec system.

A further need for transcoding may arise along the distribution chain of audio content. Audio content may be encoded by a content provider using an audio codec which is well suited for the production and the broadcasting of audio content (such as the Dolby E audio codec). The audio content may be distributed using this production-oriented audio codec, and the audio content may be transcoded in accordance to a second audio codec (such as the lossless codec Dolby TrueHD or such as the Dolby Digital Plus or the Dolby Digital codec).

The audio content is typically associated with metadata which is encoded in the bitstream representing the audio content. Usually, the audio content is split up in a sequence of frames, where each frame of audio content comprises a pre-determined number of samples (e.g. 1024 samples). A frame of the sequence of frames may be associated with a respective container or frame of metadata. The container of metadata may be indicative of information describing the frame of audio content that the container is associated with. An example for such information describing the frame may be loudness data regarding some or all of the samples of the frame. Alternatively or in addition, the container of metadata may be used to transmit auxiliary data which may not be directly associated with the corresponding frame of audio content. Such auxiliary data may e.g. be used to provide a decoder of an audio codec system with a firmware upgrade.

In addition to transcoding the audio content from a first audio codec system to a second audio codec system, the transcoder typically also needs to transcode the associated metadata. In order to reduce the cost of transcoders/converters (which are implemented e.g. within settop boxes), the computational complexity of the conversion between a first audio codec system and a second audio codec system should be relatively low. This should also be the case for the transcoding of the metadata. In the present document, methods and systems for transcoding are described, which allow for the transcoding of metadata with a reduced computational complexity.

SUMMARY

According to an aspect a transcoder configured to transcode an inbound bitstream into an outbound bitstream is described. The inbound bitstream may comprise an inbound content frame and an associated inbound metadata frame. The associated inbound metadata frame may be comprised within the inbound bitstream directly subsequent or directly preceding the inbound content frame. As such, the term "associated" may indicate a temporal relationship between a content frame and a metadata frame (e.g. the term may indicate that a content frame directly precedes a metadata frame or vice versa). It should be noted that in some embodiments, the associated inbound metadata frame may be comprised within the inbound content frame. A content frame typically comprises a first element (e.g. a synchronization field) and a last element (e.g. an error correction field such as a CRC field). The associated metadata frame may be positioned in a field of the content frame which is arranged subsequent to the first element of the content frame and prior to the last element of the content frame (e.g. in an auxiliary data field of the content frame).

The metadata frame may be a so called evolution frame. Typically, the inbound bitstream comprises a sequence of inbound content frames and an associated sequence of inbound metadata frames. The inbound metadata frames are typically interleaved with the inbound content frames, such that a particular inbound content frame is directly followed by its associated metadata frame. In a similar manner to the inbound bitstream (also referred to as an encoded inbound bitstream), the outbound bitstream (or encoded outbound bitstream) may comprise an outbound content frame and an associated outbound metadata frame. In particular, the outbound bitstream may comprise a sequence of outbound content frames and a sequence of outbound metadata frames which are interleaved.

The content frames may be indicative of a signal encoded according to a particular codec scheme. In particular, the inbound content frame may be indicative of a signal encoded according to a first codec system and the outbound content frame may be indicative of the signal encoded according to a second codec system. The first and second audio codec systems may be the same (in which case, the transcoder may be configured to provide a bit-rate conversion) or the first and the second audio codec systems may be different (in which case, the transcoder may be configured to provide a codec conversion). The signal may comprise an audio signal. Examples for the first and second codec systems are Dolby E, Dolby Digital Plus, Dolby Digital, Dolby TrueHD, Dolby Pulse, AAC (Advanced Audio Coding) and/or HE-AAC (High Efficiency—AAC). In case of different first and second codec systems, the transcoder may be configured to transcode the signal content from the first codec system to the second codec system. Alternatively or in addition, a bit-rate of the outbound bitstream may differ from a bit-rate of the inbound bitstream, and the transcoder may be configured to perform a transcoding of the encoded signal content from a first bit-rate to a second (different) bit-rate.

The signal is typically represented as a sequence of frames comprising a pre-determined number of samples of the signal (e.g. 512 or 1024 samples of the signal). As such, the inbound content frame may be indicative of some or all samples of a frame of the signal. The outbound content frame may be indicative of some or all samples of the same frame of the signal. As such, the transcoder may be configured to generate an outbound content frame which is indicative of at least some of the samples of the corresponding inbound content frame.

For transcoding the inbound bitstream into the outbound bitstream, the transcoder may comprise a decoder which is configured to decode the inbound bitstream in accordance with the first codec system. As a result of the decoding, the decoder may provide a set of PCM samples for each content frame. Furthermore, the decoder may be configured to extract the metadata from the metadata frames. The decoded inbound bitstream (e.g. the sets of PCM samples and the extracted metadata) may be provided to an encoder which is configured to encode the signal in accordance to the second codec system, thereby providing the outbound bitstream. As such, the transcoder may be configured to generate the outbound content frame from the inbound content frame using a decoder of the first codec system and an encoder of the second codec system. The transcoder may comprise a so called PCM-connected transcoder, where the decoder passes sets of PCM samples to the encoder of the transcoder. As such, the transcoder described herein may comprise the features described in the context of a PCM-connected transcoder.

It should be noted that the content frame may also be indicative of metadata in accordance to the underlying codec system. In other words, the content frame may comprise metadata associated with the signal comprised within the content frame, wherein the metadata comprised within the content frame is defined by the underlying codec system (i.e. the first or the second codec system). In contrast to this, the metadata frames allow for the transport of additional metadata (in addition to the metadata specified by the codec systems). Examples for such metadata are loudness or dialnorm parameters or auxiliary data such as firmware upgrades for a decoder within an audio content distribution chain.

The metadata frames may follow a pre-determined syntax. In particular, the inbound metadata frame and the outbound metadata frame may follow a common syntax. The syntax for metadata frames may allow a metadata frame to comprise zero, one or more blocks of metadata. Each block of metadata may comprise metadata of a particular type. As such, a metadata frame may have a variable size, depending on the amount of metadata and/or the number of metadata blocks, which are incorporated into the metadata frame. Each block of metadata may be indicative of (or may comprise) a corresponding descriptor indicative of one or more properties of the metadata comprised within the corresponding block of metadata. In particular, the descriptor may describe properties which indicate how the metadata of the block may be or should be manipulated. As such, the descriptor of a block may be used by the transcoder to transcode the block(s) comprised in the inbound metadata frame in a computational efficient manner.

For transcoding of a metadata frame, the transcoder may be configured to identify an inbound block of metadata from the inbound metadata frame. An inbound block may be identified using a block identifier. By way of example, each block of a metadata frame may be identified using a block identifier. Furthermore, the metadata frame may comprise a particular block identifier indicative of the fact that the metadata frame does not comprise any further blocks (referred to e.g. as an end identifier). The end identifier may be used by the transcoder to determine that the metadata frame does not comprise any further metadata blocks.

As indicated above, the inbound block of metadata may be associated with a descriptor, referred to as an inbound descriptor. The inbound descriptor may be indicative of one or more properties of metadata comprised within the inbound block of metadata. The descriptor may be written into a data field of the block of metadata. An example property comprised within the descriptor is a timestamp parameter which is indicative of a sample of the signal. In particular, the timestamp parameter may indicate that the metadata of the inbound block is associated with (e.g. is to be applied to) the sample of the signal, which is identified by the timestamp parameter. The timestamp parameter may identify the sample by indicating the position of the sample within a content frame relative to the end or relative to the beginning of the content frame. A further example is a duration parameter indicative of a number of samples of the signal. The duration parameter may indicate that the metadata of the inbound block is associated with the number of samples of the signal indicated by the duration parameter (starting from the sample indicated by the timestamp parameter). In particular, the duration parameter may indicate that the metadata is to be applied to a number of samples subsequent to the sample indicated by the timestamp parameter, wherein the number of samples is indicated by the duration parameter. The timestamp and/or duration parameters may be used e.g. to indicate for which samples of the signal encoded in the associated inbound content frame, the metadata (e.g. a loudness value) of the inbound block is applicable. By way of example, the inbound metadata frame may comprise a plurality of inbound blocks indicative of different loudness values for different groups of samples of the signal encoded in the inbound content frame.

Another example of a property indicated (or comprised) within the descriptor is a transcode parameter indicative of whether or not the inbound block is to be transcoded into the outbound bitstream. By way of example, the transcoder parameter may be used to indicate that the metadata comprised within the inbound block is only applicable for the first codec system. As such, the transcoder may be configured to drop the metadata comprised within the inbound block, if the outbound bitstream is encoded in accordance to a second codec system which is different from the first codec system.

A further example of a property comprised within the descriptor is a duplicate parameter indicative of whether the metadata of the inbound block is to be included in every outbound metadata frame which is generated from the inbound metadata frame. In a similar manner, a de-duplicate parameter may be used as a property which is indicative of whether the metadata of the inbound block is to be discarded by the transcoder, if the outbound metadata frame is generated from a plurality of inbound metadata frames. The duplicate and/or de-duplicate parameters may be used by the transcoder in situations where the framing of the inbound bitstream and the outbound bitstream differs.

A further example of a property is a priority parameter which is indicative of an importance of the metadata of the inbound block, relative of one or more other inbound blocks of metadata. The priority parameter may be used by the transcoder in situations, where only a reduced amount of metadata can be inserted into the outbound bitstream compared to the inbound bitstream. Another example of a property is an association parameter indicative of whether or not the metadata of the inbound block may be inserted into a delayed outbound metadata frame subsequent to the outbound metadata frame. As such, the association parameter provides the transcoder with additional flexibility in the transcoding process, as the transcoder may decide in an efficient manner on which inbound blocks may be delayed and on which inbound blocks have to be maintained in association with the associated content frames.

Another example for a property is a PCM processing parameter indicative of whether or not the metadata of the inbound block is to be discarded by the transcoder, subject to a modification of data comprised within the inbound content frame. In particular, the PCM processing parameter may indicate to the transcoder that the metadata of the inbound block is to be included into the outbound metadata frame, even if the data of the inbound content frame (e.g. the samples of the signal comprised within the inbound content frame) has been modified. This may be the case, e.g. when the inbound block comprises a payload such as binary data or such as an additional bitstream, which is unrelated to the data comprised within the inbound content frame. The PCM processing parameter is particularly relevant for so called PCM-connected transcoders.

A preferred inbound descriptor comprises at least an indication on whether a timestamp parameter and/or a duration parameter are comprised within the descriptor. Furthermore, a preferred inbound descriptor comprises a duplicate and a de-duplicate parameter.

The transcoder may be configured to generate the outbound metadata frame from the inbound metadata frame based on the inbound descriptor. In particular, the transcoder may be configured to generate the outbound metadata frame from the inbound metadata frame only based on the one or more properties indicated by the inbound descriptor. Even more particularly, the transcoder may be configured to generate the outbound metadata frame from the inbound metadata frame without analyzing the metadata comprised within the inbound block. As such, the transcoder may perform transcoding of the metadata comprised within a metadata frame solely based on the descriptors of the blocks of metadata, without the need to analyze and/or interpret the metadata carried by the blocks of metadata. This results in a transcoder having a significantly reduced computational complexity.

The transcoder may be configured to generate the outbound metadata frame from the inbound metadata frame by copying the metadata from the one or more inbound blocks of the inbound metadata frame to corresponding one or more outbound blocks. The one or more outbound blocks may be inserted into the outbound metadata frame. The copying and inserting may be subjected to the one or more properties indicated by the inbound descriptor(s) of the one or more inbound blocks. By way of example, the association parameter may indicate to the transcoder that a particular inbound block is to be inserted into the outbound metadata frame. On the other hand, the transcoder parameter may indicate to the transcoder that the particular inbound block should be dropped, if the second codec system is different from the first codec system.

The transcoder may be configured to generate the outbound metadata frame by generating an outbound descriptor of the outbound block based on the inbound descriptor of the inbound block. In particular, the outbound descriptor may comprise or may be indicative of some or all of the properties indicated by the inbound descriptor. Some or all of the properties of the inbound descriptor may be copied to the outbound descriptor. On the other hand, the transcoder may be configured to modify one or more of the properties indicated by the inbound descriptor for generating the outbound descriptor, wherein the outbound descriptor is indicative of the one or more modified properties. By way of example, the inbound descriptor may be indicative of a timestamp parameter. The timestamp parameter may be modified by the transcoder such that the modified timestamp parameter indicates the same sample of the signal as the original timestamp parameter, even though the transcoder may have performed a re-framing of the outbound bitstream with respect to the inbound bitstream.

As indicated above, the one or more properties of the inbound descriptor may comprise a timestamp parameter indicative of a sample of the signal, which the metadata of the inbound block is associated with. The timestamp parameter of the inbound descriptor typically indicates the sample of the signal relative of the inbound content frame. The transcoder may be configured to generate an outbound block from the inbound block. Furthermore, the transcoder may be configured to generate an outbound descriptor of the outbound block by modifying the timestamp parameter of the inbound descriptor such that the corresponding timestamp parameter of the outbound descriptor indicates the sample of the signal relative of the outbound content frame (which may have a different framing than the inbound content frame). As such, the transcoder may be configured to ensure that the one or more properties indicated by the inbound descriptor remain valid, even when the inbound bitstream is subjected to re-framing.

The transcoder may be configured to insert the outbound block (generated from the inbound block of the inbound metadata frame) into a delayed outbound metadata frame. By way of example, the association parameter of the inbound descriptor may indicate to the transcoder that the inbound block may be delayed. The transcoder may chose to insert the metadata into a delayed outbound metadata frame (e.g. due to a limited bit-rate of the second bitstream). The delayed outbound metadata frame may be associated with a delayed outbound content frame which does not comprise the sample of the signal which is indicated by the timestamp parameter of the inbound block. In order to ensure that, nevertheless, the timestamp parameter of the outbound block identifies the correct sample of the signal, the transcoder may be configured to generate the outbound descriptor of the outbound block by modifying the timestamp parameter of the inbound block such that the timestamp parameter of the outbound descriptor indicates the sample of the signal relative to the delayed outbound content frame. By way of example, the modified timestamp parameter may indicate a sample number which exceeds the number of samples of the delayed content frame, thereby indicating that the sample of the signal lies outside of the delayed content frame.

As indicated above, the one or more properties of the inbound descriptor may comprise a duplicate parameter indicative of whether the metadata of the corresponding inbound block is to be included in every outbound metadata frame which is generated from the inbound metadata frame. The transcoder may be configured to generate a plurality of outbound metadata frames from the inbound metadata frame, by taking into account the duplicate parameter. In particular, the transcoder may be configured to determine that the duplicate parameter indicates that the metadata of the inbound block is to be included in every outbound metadata frame which is generated from the inbound metadata frame. In such a case, the transcoder may be configured to insert the metadata of the inbound block into each of the plurality of outbound metadata frames. In particular, the transcoder may be configured to generate an outbound block from the inbound block for each of the plurality of outbound metadata frames. In addition to generating a plurality of outbound metadata frames, the transcoder may be configured to generate a plurality of outbound content frames from the inbound content frame, wherein the plurality of outbound content frames may be associated with the plurality of outbound metadata frames, respectively.

The duplicate parameter may comprise a flag which may be set to indicate that the metadata of the inbound block is to be included in every outbound metadata frame which is generated from the inbound metadata frame, or vice versa (i.e. the flag may be set to indicate the contrary instead).

As indicated above, the one or more properties of the inbound descriptor may comprise a de-duplicate parameter indicative of whether the metadata of the inbound block may be (or is to be) discarded by the transcoder, if the outbound metadata frame is generated from a plurality of inbound metadata frames. The transcoder may be configured to generate the outbound metadata frame from a plurality of inbound metadata frames of the inbound bitstream, by taking into account the de-duplicate parameter. In particular, the plurality of inbound metadata frames may comprise a plurality of inbound blocks of metadata, each inbound block being associated with a respective de-duplicate parameter indicating that the metadata of the inbound block may be discarded by the transcoder. The transcoder may be configured to discard the metadata of the plurality of inbound blocks for all but one of the plurality of inbound metadata frames (e.g. for all but the first one of the plurality of inbound metadata frames), for generating the outbound metadata frame. In addition to generating the outbound metadata frame from a plurality of inbound metadata frames, the transcoder may be configured to generate the outbound content frame from a plurality of inbound content frames, wherein the plurality of inbound content frames are associated with the plurality inbound metadata frames, respectively.

The de-duplicate parameter may comprise a flag which may be set to indicate that the metadata of the inbound block may be (or is to be) discarded by the transcoder, if the outbound metadata frame is generated from a plurality of inbound metadata frames, or vice versa (i.e. the flag may be set to indicate the contrary instead).

As indicated above, the one or more properties of the inbound descriptor may comprise a priority parameter indicative of a relative importance of the metadata of the inbound block relative of one or more other inbound blocks of metadata. The inbound metadata frame received at the transcoder may comprise a plurality of inbound blocks with descriptors indicating different values for the priority parameter. The transcoder may be configured to generate the outbound metadata frame from the plurality of inbound blocks in accordance to the priority parameters of the plurality of inbound blocks. In particular, the transcoder may first select the inbound block(s) having the highest relative priority and only insert the lower priority inbound blocks, if sufficient bit-rate is available for the outbound bitstream.

The plurality of inbound blocks may be associated with incremental priority parameters indicating incremental priorities. The plurality of inbound blocks may comprise incremental metadata, such that the combined metadata of the plurality of inbound blocks provides high quality metadata and such that the metadata of the inbound block having the highest relative priority from the plurality of inbound blocks provides reduced quality metadata (i.e. providing metadata with a quality which is reduced compared to the high quality metadata provided by the combined metadata). The inbound block with the next lower priority may provide an increase of the quality of the metadata and so on, until the highest quality of metadata is provided when combining the complete plurality of inbound blocks. The transcoder may be configured to generate the outbound metadata frame based on at least one or more of the plurality of inbound blocks, thereby allowing for a scalable degradation of the quality of the metadata comprised within the outbound metadata frame. The degree of degradation may e.g. be based on the available bit-rate of the outbound bitstream.

As indicated above, the one or more properties of the inbound descriptor may comprise an association parameter indicative of whether or not the metadata of the inbound block may be inserted into a delayed outbound metadata frame subsequent to the outbound metadata frame. The transcoder may be configured to insert the metadata from the inbound block into the outbound metadata frame, based on the association parameter and/or based on bit-rate restrictions on the outbound bitstream. In particular, the transcoder may be configured to insert the metadata from the inbound block into a delayed outbound metadata frame subsequent to the outbound metadata frame, if the association parameter indicates that the metadata of the inbound block may be delayed.

According to a further aspect, a method for transcoding an inbound bitstream comprising an inbound content frame and an associated inbound metadata frame into an outbound bitstream is described. The outbound bitstream may comprise an outbound content frame and/or an associated outbound metadata frame. The inbound content frame may be indicative of a signal encoded according to a first codec system and the outbound content frame may be indicative of the signal encoded according to a second codec system. As indicated above, the first and second codec systems may be the same or may be different. The method may comprise identifying an inbound block of metadata from the inbound metadata frame. The inbound block of metadata may be associated with an inbound descriptor indicative of one or more properties of metadata comprised within the inbound block of metadata. Furthermore, the method may comprise generating the outbound metadata frame from the inbound metadata frame based on the inbound descriptor. In other words, the outbound metadata frame may be determined by considering the inbound descriptor, typically without the need to further analyze the metadata comprised within the inbound metadata frame.

According to another aspect, an encoded bitstream comprising a content frame and an associated metadata frame is described. The content frame may be indicative of a signal encoded according to a first codec system. The metadata frame may comprise a block of metadata and the block of metadata may be associated with (or may comprise) a descriptor indicative of one or more properties of metadata comprised within the block of metadata.

According to a further aspect, an encoder configured to generate an encoded bitstream comprising a content frame and an associated metadata frame is described. The content frame may be indicative of a signal encoded according to a codec system. The encoder may be configured to generate a block of metadata. Furthermore, the encoder may be configured to determine a descriptor associated with the block of metadata. The descriptor may be indicative of one or more properties of the metadata comprised within the block of metadata. Furthermore, the encoder may be configured to insert the block of metadata into the metadata frame. It should be noted that the features described in the present document in the context of a transcoder are also applicable to a corresponding encoder.

In particular, the one or more properties may comprise a timestamp parameter indicative of a sample of the signal, which the metadata comprised in the block of metadata is associated with. The sample of the signal may be comprised within the content frame. The encoder may be configured to insert the block into a delayed metadata frame, wherein the delayed metadata frame is associated with a delayed content frame which does not comprise the sample of the signal. Furthermore, the encoder may be configured to generate the descriptor of the block of metadata such that the timestamp parameter of the descriptor indicates the sample of the signal relative of the delayed content frame. As such, the encoder may be configured to delay the transmission of metadata and to modify the timestamp parameter accordingly, thereby smoothening the bit-rate of the bitstream generated by the encoder.

According to an aspect, a corresponding decoder is described. The decoder may comprise any of the decoder related features described in the present document. The decoder may be configured to decode an encoded bitstream comprising a content frame and an associated metadata frame. As outlined above, the content frame is indicative of a signal encoded according to a first codec system. The metadata frame may comprise a block of metadata, wherein the block of metadata is associated with (or comprises) a descriptor indicative of one or more properties of metadata comprised within the block of metadata. The decoder may be configured to decode the encoded signal comprised within the content frame. In particular, the decoder may comprise a decoder of the first codec system to decode the encoded signal. As a result, the decoder may be configured to provide a set of PCM samples of the encoded signal.

Furthermore, the decoder may be configured to identify the block of metadata from the metadata frame and to extract the descriptor from the block of metadata. In addition, the decoder may be configured to process the metadata comprised within the block of metadata in dependence on the one or more properties indicated by the descriptor. The one or more properties may correspond to any one or more of the properties described in the present document. The decoder may be configured to associate a particular property of the metadata with corresponding processing of the metadata. By way of example, the descriptor may be indicative of a timestamp parameter, thereby informing the decoder that the metadata of the block of metadata is to be applied to a particular sample of the signal. As such, the decoder may be configured to apply the metadata to the sample indicated by the timestamp parameter. As another example, the descriptor may be indicative of an association parameter. If the association parameter indicates that the block of metadata is unrelated to the content frame, the decoder may be configured to pass the metadata comprised within the block of metadata to another processing unit (which deals e.g. with auxiliary data comprised within the block metadata).

According to a further aspect, a method for decoding an encoded bitstream comprising a content frame and an associated metadata frame is described. The content frame may be indicative of a signal encoded according to a first codec system. The metadata frame may comprise a block of metadata, wherein the block of metadata may be associated with a descriptor indicative of one or more properties of metadata comprised within the block of metadata. The method may comprise decoding the encoded signal comprised within the content frame. Furthermore, the method may comprise identifying the block of metadata from the metadata frame and extracting the descriptor from the block of metadata. In addition, the method may comprise processing the metadata comprised within the block of metadata based on the one or more properties indicated by the descriptor.

According to another aspect, a method for generating an encoded bitstream comprising a content frame and an associated metadata frame is described. The content frame may be indicative of a signal encoded according to a codec system. The method may comprise generating a block of metadata. Furthermore, the method may comprise determining a descriptor associated with the block of metadata, wherein the descriptor is indicative of one or more properties of the metadata comprised within the block of metadata. In addition, the method may comprise inserting the block of metadata into the metadata frame.

According to a further aspect, an encoder configured to generate an encoded bitstream comprising a content frame and an associated metadata frame is described. The content frame may be indicative of a signal encoded according to a first codec system. The encoder may be configured to generate a block of metadata. In a preferred embodiment, the block of metadata comprises a descriptor as described in the present document. The descriptor may be indicative of one or more properties of the metadata comprised within the block of metadata.

The encoder may be configured to insert the block of metadata into the metadata frame. Furthermore, the encoder may be configured to select a secure key from a plurality of pre-determined secure keys. The plurality of pre-determined secure keys may be configured such that it provides different levels of trust. In particular, the plurality of pre-determined secure keys may comprise a highly secure key known only to a developer of the encoder (or of a corresponding decoder or of a corresponding transcoder comprising a decoder and an encoder). Furthermore, the plurality of pre-determined secure keys may comprise a moderate secure key known to an operator of the encoder (or of a corresponding decoder or of a corresponding transcoder comprising a decoder and an encoder).

The encoder may be configured to generate a cryptographic value based at least on the content frame, on the associated metadata frame and on the selected secure key. In particular, the encoder may be configured to calculate an HMAC-MD5 value or an HMAC-SHA256 value (Secure Hash Algorithm as specified in the Federal Information Processing Standard FIPS PUB 180-2) for generating the cryptographic value. In addition, the encoder may be configured to truncate the HMAC-MD5 or HMAC-SHA256 value to yield the cryptographic value. By truncating the HMAC value, the overhead required for the cryptographic value may be reduced. The encoder may be configured to insert the generated cryptographic value into the metadata frame, thereby ensuring that the content frame and/or the metadata frame cannot be modified by an unauthorized party without being detected.

The use of different secure keys which provide different levels of trust ensures that a corresponding decoder (or a transcoder comprising a decoder) can verify whether the received bitstream has been modified and if yes, which party has modified the received bitstream. By way of example, the encoder may have initially generated the bitstream using the highly secure key. An intermediate party may have modified the bitstream and may have used the moderate secure key to generate a modified cryptographic value. As such, the decoder is aware that the received bitstream has been modified by a party having access to the moderate secure key. It should be noted that the plurality of pre-determined secure keys may comprise more than two levels of trust, thereby providing a decoder with more details regarding the trustworthiness of a received bitstream.

The encoder may be configured to insert an indication of the selected secure key into the metadata frame, thereby enabling the corresponding decoder to easily verify whether the received bitstream has been modified. On the other hand, the decoder may be configured to verify the authenticity of the received bitstream using all of the plurality of pre-determined secure keys, without a need for the indication of the selected secure key to be inserted into the metadata frame.

The encoder may be configured to generate a plurality of succeeding content frames and associated metadata frames for the encoded bitstream. Furthermore, the encoder may be configured to generate a frame cryptographic value based on a single content frame and its associated metadata frame and based on the selected secure key. The frame cryptographic value may be inserted into the associated metadata frame and may be used by a corresponding decoder (or transcoder) to verify the authenticity of an individual content/metadata frame. Furthermore, the encoder may be configured to generate a historic cryptographic value based on at least some of the plurality of succeeding content frames and their associated metadata frames, and based on the selected secure value. The historic cryptographic value may be inserted into one of the plurality of succeeding metadata frames and may be used by the corresponding decoder (or transcoder) to verify the correct sequential order of the plurality of succeeding content frames and metadata frames.

According to a further aspect, a method for generating an encoded bitstream comprising a content frame and an associated metadata frame is described. The content frame may be indicative of a signal encoded according to a first codec system. The method may comprise generating a block of metadata and inserting the block of metadata into the metadata frame. Furthermore, the method may comprise selecting a secure key from a plurality of pre-determined secure keys, wherein the plurality of pre-determined secure keys provides different levels of trust. In addition, the method may comprise generating a cryptographic value based at least on the content frame, on the associated metadata frame and on the selected secure key. The generated cryptographic value may then be inserted into the metadata frame.

According to a further aspect, a corresponding decoder is described. The decoder may be configured to receive an encoded bitstream comprising a content frame and an associated metadata frame. The encoded bitstream may have any one or more of the properties described in the present document. In particular, the content frame may be indicative of a signal encoded according to a first codec system (e.g. a codec system as referred to in the present document). The decoder may be configured to extract a cryptographic value from the metadata frame. The cryptographic value may have been inserted into the metadata frame by a corresponding encoder, as described in the present document. In particular, the cryptographic value may have been determined using one of a plurality of pre-determined secure keys. As outlined above, the plurality of pre-determined secure keys may provide different levels of trust. By way of example, the plurality of pre-determined secure keys may comprise a highly secure key and a moderate secure key.

The decoder may be configured to determine a secure key from the plurality of pre-determined secure keys. In particular, the decoder may be configured to determine the secure key by extracting the secure key from the metadata frame (e.g. from a particular field of the metadata frame). Furthermore, the decoder may be configured to generate a verification cryptographic value based at least on the received content frame, on the received associated metadata frame and on the determined secure key. In addition, the decoder may be configured to compare the extracted cryptographic value and the verification cryptographic value, in order to determine whether the received encoded bitstream can be trusted. By way of example, if the extracted cryptographic value and the verification cryptographic value match, the decoder may determine that the received encoded bitstream can be trusted. Furthermore, the secure key used for generating the verification cryptographic value may indicate to the decoder the level of trust which is associated with the received encoded bitstream. By way of example, the highly secure key may indicate a higher level of trust than the moderate secure key.

The decoder may be configured to determine which one of the plurality of pre-determined secure keys has been used to generate the extracted cryptographic value. As indicated above, the secure key, which has been used to generate the extracted cryptographic value, may provide an indication of the level of trust of the received encoded bitstream. In particular, the decoder may be configured to generate a plurality of verification cryptographic values for the plurality of pre-determined secure keys, respectively. Furthermore, the decoder may be configured to compare each one of the plurality of verification cryptographic values with the extracted cryptographic value. In addition, the decoder may be configured to determine that one of the plurality of pre-determined secure keys has been used to generate the extracted cryptographic value, if the comparison shows that one of the plurality of verification cryptographic values matches the extracted cryptographic value.

According to a further aspect, a method for determining a level of trust of a received encoded bitstream comprising a content frame and an associated metadata frame is described. The content frame may be indicative of a signal encoded according to a first codec system. The method may comprise extracting a cryptographic value from the metadata frame. Furthermore, the method may comprise determining a secure key from a plurality of pre-determined secure keys, wherein the plurality of pre-determined secure keys provides different levels of trust. In addition, the method may comprise generating a verification cryptographic value based at least on the content frame, on the associated metadata frame and on the determined secure key. The method may proceed in comparing the extracted cryptographic value and the verification cryptographic value to determine a level of trust for the received encoded bitstream, wherein the level of trust may be indicated by the determined secure key.

According to another aspect, a transcoder configured to transcode an inbound bitstream comprising an inbound content frame and an associated inbound metadata frame into an outbound bitstream is described. The transcoder may comprise any of the transcoder related features described in the present document. As outlined above, the inbound bitstream may be indicative of a set of samples of a signal, e.g. indicative of the samples of a frame of the signal. The transcoder may comprise a decoder (for decoding the received inbound bitstream) and an encoder (for re-encoding the decoded inbound bitstream to provide the transcoded outbound bitstream). The transcoder may comprise a so called PCM-connected transcoder.

The decoder of the transcoder may be configured to convert the inbound content frame into a set of decoded PCM samples of the signal. Furthermore, the decoder may be configured to extract metadata from the inbound metadata frame. As such, the decoder may be configured to convert the inbound bitstream into a sequence of decoded PCM samples and associated metadata. The sequence of decoded PCM samples and the associated metadata may be used by the encoder of the transcoder to generate the outbound bitstream (in accordance with the second codec system). The decoder may be configured to generate a signature value for the set of decoded PCM samples and the extracted metadata, using a decoder secure key. The signature value may be generated using an HMAC-MD5 or an HMAC-SHA256 hash function. The resulting value may be truncated to provide the signature value. As such, the decoder may be configured to provide a signature value, thereby enabling the encoder to verify whether the decoded PCM samples and/or the metadata has been modified by an unauthorized entity (which does not have access to the decoder secure key) between the decoder and the encoder of the transcoder.

The encoder of the transcoder may be configured to receive a set of PCM samples and associated metadata. The received set of PCM samples typically corresponds to the set of decoded PCM samples provided by the decoder and the received metadata typically corresponds to the extracted metadata from the decoder. However, the PCM samples and/or the metadata may have been modified, such that the received set of PCM samples and/or the received metadata may differ from the set of decoded PCM samples and/or the extracted metadata.

The encoder may be configured to receive a signature value. The received signature value may correspond or may be equal to the signature value generated by the decoder. On the other hand, the received signature value may be different from the signature value generated by the decoder (e.g. if modified by an authorized entity, subject to modification of the PCM samples and/or the metadata). The encoder may be configured to verify whether the received signature value is valid for the received set of PCM samples and associated metadata, using an encoder secure key. Furthermore, the encoder may be configured to generate an outbound content frame of the outbound bitstream from the received set of PCM samples and generate an associated outbound metadata frame of the outbound bitstream from the received metadata, if the received signature is valid. On the other hand, the encoder may be configured to prevent the insertion of the received metadata into the outbound bitstream, if the received signature is not valid. As such, the encoder of the transcoder may be configured to prevent the insertion of metadata frames into the outbound bitstream, if the metadata or the PCM samples have been modified by an unauthorized entity.

It should be noted that the decoder and the encoder used within a transcoder are typically provided by the developer of the respective audio codec system. As such, the functionality of the decoder and the encoder may be controlled by the developer, thereby ensuring a high quality of audio content and associated metadata. On the other hand, the PCM samples and/or metadata between the decoder and the encoder may be modified by an unauthorized entity, thereby presenting a risk that the quality of audio content and/or metadata is reduced. By providing a decoder which generates signature values and by providing an encoder which verifies signature values, it can be ensured that the unauthorized modification of PCM samples and/or metadata can be detected.

The encoder may be configured to use the decoder secure key as the encoder secure key. As such, it is ensured that the encoder can verify whether the received PCM samples and metadata correspond to the PCM samples and metadata provided by the corresponding decoder.

The transcoder may further comprise a PCM processing stage which is configured to modify the set of decoded PCM samples and/or the extracted metadata, thereby yielding a set of second PCM samples and associated second metadata. The set of second PCM samples may correspond to the set of decoded PCM samples or to the set of modified PCM samples. In a similar manner, the second metadata may correspond to the extracted metadata or to the modified extracted metadata. Furthermore, the PCM processing stage may be configured to pass the set of second PCM samples and associated second metadata to the encoder. Using the received signature value and the encoder secure key, the encoder may be configured to detect that the decoded PCM samples and/or the extracted metadata has been modified by the PCM processing stage. In other words, the encoder may be configured to detect that the second PCM samples (received by the encoder) and the second metadata (received by the encoder) do not correspond to the decoded PCM samples and the extracted metadata (provided by the decoder).

The transcoder may further comprise a re-signing unit which is configured to determine an updated signature value for the set of second PCM samples and associated second metadata, using a re-signing secure key. Furthermore, the re-signing unit may be configured to pass the updated signature value to the encoder. The re-signing secure key may be different from the decoder secure key. The encoder may be configured to use the re-signing secure key as the encoder secure key. As such, the encoder may be configured to detect that the PCM samples and/or associated metadata have been modified by an authorized PCM processing stage. In a similar manner to the cryptographic values described in the present document, the secure keys for the signature values may be selected from a plurality of pre-determined secure keys. By way of example, the decoder secure key may be a highly secure key, whereas the re-signing secure key may be a moderate secure key, thereby providing different levels of trust for the PCM samples and/or associated metadata received at the encoder of the transcoder.

The encoder of the transcoder may comprise a PCM processing stage configured to modify the set of received PCM samples and/or the received metadata. The set of received PCM samples may correspond to the set of decoded PCM samples or to the set of second PCM samples. In a similar manner, the received metadata may correspond to the extracted metadata or to the second metadata. The encoder may be configured to generate the outbound content frame and/or the outbound metadata frame based on the modified set of received PCM samples and/or modified received metadata, which have been modified by the PCM processing stage of the encoder. By providing the encoder of the transcoder with a PCM processing stage, it can be ensured that a chain of trust is maintained within the transcoder (as the PCM processing is performed within the encoder provided by a developer of the encoder).

As indicated above, the PCM-connected transcoder may comprise any of the features described in the present document. In particular, the decoder of the transcoder may be configured to identify an inbound block of metadata from the inbound metadata frame. As outlined in the present document, the inbound block of metadata may be associated with an inbound descriptor indicative of one or more properties of metadata comprised within the inbound block of metadata. The one or more properties may be any one or more of the properties described in the present document. The encoder of the transcoder may be configured to generate the outbound metadata frame from the inbound metadata frame at least based on the inbound descriptor.

In particular, the one or more properties may comprise a PCM processing parameter indicative of whether or not the metadata of the inbound block is to be discarded by the encoder, subject to a modification of the set of PCM samples and/or of the extracted metadata. In such cases, the encoder of the transcoder may be configured to include or not include the inbound block into the outbound metadata frame based on the value of the PCM processing parameter. In particular, the encoder may be configured to include the metadata of the inbound block into the outbound metadata frame, if the PCM processing parameter indicates that the metadata of the inbound block should not be discarded, even if the set of PCM samples and/or the extracted metadata has been modified. This may be useful, e.g. in situation where the metadata comprised within the inbound block is independent of the set of PCM samples (as is the case e.g. for auxiliary data or binary data).

The PCM processing stage of the transcoder may be configured to provide an indication of one or more PCM processing conditions to the encoder of the transcoder. The one or more PCM processing conditions may indicate how the set of PCM samples and/or how the extracted metadata has been processed by the PCM processing stage. By way of example, the one or more PCM processing conditions may comprise one or more of: conversion of a sampling rate of the set of PCM samples, mixing of the PCM samples with a system sound, modification of the extracted metadata, modification of a channel configuration of the set of PCM samples (in case of an audio signal), leveling of the loudness of the set of PCM samples. The encoder may then be configured to generate the outbound metadata frame from the inbound metadata frame also based on the one or more PCM processing conditions. In particular, the encoder may be configured to decide on whether to include or to not include the inbound block into the outbound metadata frame, based on the value of the PCM processing parameter and based on the one or more PCM processing conditions. In particular, the PCM processing parameter may indicate how to process the inbound block, subject to one or more PCM processing conditions.

According to a further aspect, a method for transcoding an inbound bitstream comprising an inbound content frame and an associated inbound metadata frame into an outbound bitstream is described. The inbound bitstream may be indicative of a set of samples of a signal. The method may comprise converting the inbound content frame, at a decoder, into a set of decoded PCM samples of the signal. Furthermore, the method may comprise extracting metadata, at the decoder, from the inbound metadata frame. Furthermore, a signature value for the set of decoded PCM samples and the extracted metadata may be generated, using a decoder secure key. The set of decoded PCM samples, the extracted metadata and the generated signature value may be passed to a corresponding encoder. In addition, the method may comprise receiving a set of PCM samples and associated metadata, and receiving a signature value, at the encoder. The method may proceed in determining whether the received signature value is valid for the received set of PCM samples and associated metadata, using an encoder secure key. Subsequently, an outbound content frame of the outbound bitstream may be generated from the received set of PCM samples and an associated outbound metadata frame of the outbound bitstream may be generated from the received metadata, if the received signature is valid.

According to further aspects, the above mentioned decoder and encoder of a PCM-connected transcoder are described stand-alone. The decoder and/or the encoder may comprise any one or more of the decoder and/or encoder related features described in the present document, respectively. The decoder and/or the encoder may be used in a transcoder (as describe above). Alternatively or in addition, the decoder and/or the encoder may be used stand-alone. As such, according to a further aspect, a decoder configured to decode an inbound bitstream comprising an inbound content frame and an associated inbound metadata frame is described. The inbound bitstream may be indicative of a set of samples of a signal. The decoder may be configured to convert the inbound content frame into a set of decoded PCM samples of the signal. Furthermore, the decoder may be configured to extract metadata from the inbound metadata frame. In addition, the decoder may be configured to generate a signature value for the set of decoded PCM samples and for the extracted metadata, using a decoder secure key. As such, the set of decoded PCM samples and the associated extracted metadata may be protected using a signature value. The signature value may be used by a receiving party of the set of decoded PCM samples and of the associated extracted metadata to verify whether the set of decoded PCM samples and/or the associated extracted metadata has been modified in an unauthorized manner. The receiving party may be an encoder which is configured to re-encode the set of decoded PCM samples and the associated extracted metadata into an outbound bitstream. Hence, the decoder may be configured to send the set of decoded PCM samples, the extracted metadata and the generated signature value to an encoder for re-encoding.

According to another aspect, an encoder configured to encode an outbound bitstream comprising an outbound content frame and an associated outbound metadata frame is described. The encoder may be configured to receive a set of PCM samples and associated metadata, and to receive a signature value for the set of PCM samples and associated metadata. The received set of PCM samples may correspond to (or may have been derived from) the above mentioned set of decoded PCM samples). In a similar manner, the received set of associated metadata may correspond to (or may have been derived from) the above mentioned set of extracted metadata. The received signature value may have been determined (e.g. at a decoder) using the above mentioned set of decoded PCM samples and the extracted metadata.

The encoder may be configured to verify whether the received signature value is valid for the received set of PCM samples and associated metadata, using an encoder secure key. Furthermore, the encoder may be configured to generate an outbound content frame of the outbound bitstream from the received set of PCM samples and to generate an associated outbound metadata frame of the outbound bitstream from the received metadata, if the received signature is valid.

According to another aspect, a method for decoding an inbound bitstream comprising an inbound content frame and an associated inbound metadata frame is described. The inbound bitstream may be indicative of a set of samples of a signal. The method may comprise converting the inbound content frame into a set of decoded PCM samples of the signal, and extracting metadata from the inbound metadata frame. Furthermore, the method may comprise generating a signature value for the set of decoded PCM samples and for the extracted metadata, using a decoder secure key. In addition, the method may comprise providing the set of decoded PCM samples, the extracted metadata and the generated signature value to an encoder for re-encoding.

According to a further aspect, a method for encoding an outbound bitstream comprising an outbound content frame and an associated outbound metadata frame is described. The method may comprise receiving a set of PCM samples and associated metadata, and receiving a signature value for the set of PCM samples and associated metadata. Furthermore, the method may comprise verifying whether the received signature value is valid for the received set of PCM samples and associated metadata, using an encoder secure key. The method may proceed in generating an outbound content frame of the outbound bitstream from the received set of PCM samples and in generating an associated outbound metadata frame of the outbound bitstream from the received metadata, if the received signature is valid.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

SHORT DESCRIPTION OF THE FIGURES

The invention is explained below in an exemplary manner with reference to the accompanying drawings, wherein FIG. 1a shows a block diagram of an example audio content distribution chain comprising a transcoder;

DETAILED DESCRIPTION

Figure 1A:
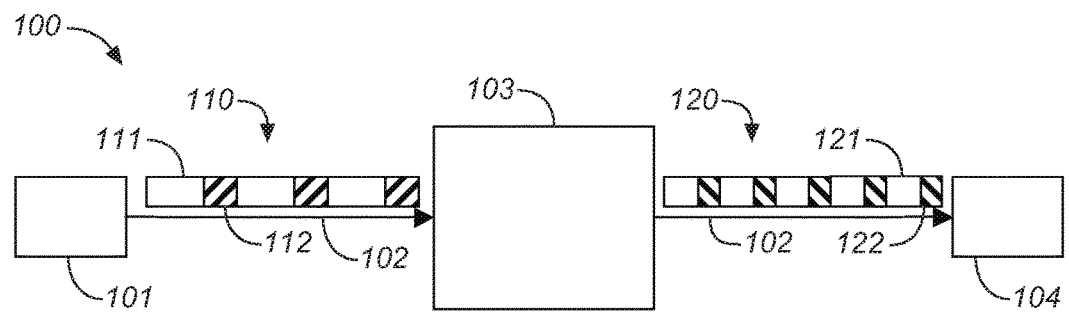
FIG. 1b shows an example structure of a metadata frame.

As outlined in the background section, audio content is typically associated with metadata and encoded into a joint bitstream comprising a sequence of encoded content frames and an associated sequence of metadata containers (also referred to as metadata frames). FIG. 1 shows a block diagram of an example distribution system 100 for audio content. The methods and systems described in the present document are outlined in the context of audio content. It should be noted, however, that the methods and systems are applicable to other types of content, such as video content. In more general terms, the methods and systems described in the present document are applicable to multi-media content, such as audio and/or video, wherein the multi-media content is associated with metadata.

The distribution system 100 comprises an encoder 101 which is configured to encode the audio content and provide an encoded bitstream 110 (also referred to as the first encoded bitstream 110 or the inbound encoded bitstream 110). The first encoded bitstream 110 typically comprises a sequence of encoded content frames 111, wherein an encoded content frame 111 may be associated with a corresponding metadata frame 112. The encoder 101 is configured to provide a first encoded bitstream 110 which is encoded in accordance to a first audio codec system. The first audio codec system may e.g. be one of: Dolby E, Dolby Digital Plus, Dolby Digital Dolby True HD, Dolby Pulse, AAC and/or HE-AAC. The content frames 111 may represent or may comprise a pre-determined number of samples of the audio content, e.g. 1536, 1024 or 512 samples of the audio content.

The first encoded bitstream 110 is provided to a transcoder 103 via a transmission medium or via a storage medium 102. The transcoder 103 is configured to transcode or convert the first encoded bitstream 110 into a second encoded bitstream 120 (also referred to as an outbound bitstream 120), wherein the second encoded bitstream 120 is encoded in accordance to a second audio codec system. The second audio codec system may be different from the first audio codec system. On the other hand, the second audio codec system may be the same as the first audio codec, but use a different configuration e.g. a different bit-rate, a different frame-rate and/or a different channel configuration. The second audio codec system may e.g. be one of: Dolby E, Dolby Digital Plus, Dolby Digital Dolby True HD, Dolby Pulse, AAC and/or HE-AAC. In a similar manner to the first encoded bitstream 110, the second encoded bitstream 120 comprises a sequence of content frames 121 and a corresponding sequence of metadata frames 122. The content frames 121 of the second encoded bitstream 120 may have a frame size which is different from the frame size of the content frames 111 of the first encoded bitstream 110. The second encoded bitstream 120 may be provided to a decoder 104 for rendering of the audio content.

The metadata frames 112, 122 may have a pre-determined structure. In other words, the metadata frames 112, 122 may follow a pre-determined syntax. By way of example, the metadata frames 112, 122 may follow the so called evolution frame syntax illustrated in Table 1. The evolution frame syntax may e.g. be used in the context of standardized multi-media content codec systems such as the Digital Video Broadcast (DVB) system and/or a Moving Picture Expert Group (MPEG) codec system. It should be noted that the metadata frame syntax shown in Table 1 and the following tables is only an example. Variations or modifications of the syntax are possible. In particular, the syntax shown in the present document may be extended by additional fields, e.g. for providing additional functionalities.

TABLE 1

| Syntax | No. of bits | Comments |
|---|---|---|
| evo_frame( ) | | |
| { | | |
| key_id = variable_bits (3); | | |
| while ((id = payload_id) != END) { | 5 | |
| if (payload_id == 31) { | | |
| payload_id += variable_bits (5); | | |
| } | | |
| payload_config( ); | | |
| payload_size = variable_bits (8); | | |
| payload (payload_id, payload_size); | | |
| } | | |
| protection( ); | | |
| } | | |

The semantics of the parameters of the evolution frame shown in Table 1 may be as follows:

key_id may be an identifier of the cryptographic key used for hashing (i.e. used for calculating the protection_bits of the protection( ) field).

payload_id may be an identifier of the following application payload; a payload_id END="0000b" may have the meaning that no further payload is contained in this evo_frame( )

payload_size may indicate the number of bytes in the following payload field.

The evolution frame syntax specifies a metadata frame 112, 122 which may comprise a plurality of blocks of metadata, wherein a block of metadata is also referred to as a playload. As such, a metadata frame 112, 122 may comprise zero, one or more blocks of metadata, wherein each block of metadata is indicative of a particular type and/or a particular aspect of metadata. Example for types of metadata are descriptive metadata which describes particular aspects of the content frame 111 that the metadata frame 112 is associated with (e.g. tempo and/or harmonic information);

unrelated metadata which comprises auxiliary data, which is not directly related to the content frame 111 (such as firmware upgrades for a target decoder of the encoded audio content);

control metadata which may be used to control the rendering of one or more samples of the content frame 111 that the metadata frame 112 is associated with (e.g. loudness values for one or more samples of the content frame 111).

As such, the metadata frame 112 provides a flexible structure which can be expanded by additional blocks of metadata as needed, in order to describe additional characteristics of the encoded audio content or in order to transmit additional auxiliary data within the bitstream 110. In case no metadata is to be transmitted along with a content frame 111, the metadata frame 112 may comprise no block of metadata, which may be indicated in the syntax of the evolution frame of Table 1 by a payload_id which corresponds to a predetermined "END" ID (identifier).

In the present document, it is proposed to add a descriptor to a block of metadata, wherein the descriptor describes one or more characteristics or properties of the metadata comprised within the associated block of metadata. This descriptor is referred to as "payload_config( )" in the syntax of the evolution frame shown in Table 1. The descriptor may be used by a transcoder to perform an efficient transcoding of the block of metadata, without the need to analyze the metadata comprised within the associated block of metadata. As a result of this, the complexity of the transcoding of metadata can be significantly reduced.

In other words, the present document describes methods of transcoding blocks of metadata (also referred to as payloads) within a metadata frame 112 (e.g. within the evolution frame shown in Table 1) from one coded bitstream to another bitstream. The transcoding operations may be guided by specific fields within each payload (e.g. the field "payload_config( )" of a block of metadata, as shown in Table 1). The transcoding operations may then be specified such that the individual payloads can be appropriately transcoded from one coded stream to another coded stream, without the need to extract or interpret the essence of the underlying metadata parameters of the block of metadata (i.e. without the need to extract or interpret the essence of the underlying payloads).

Figure 1B:
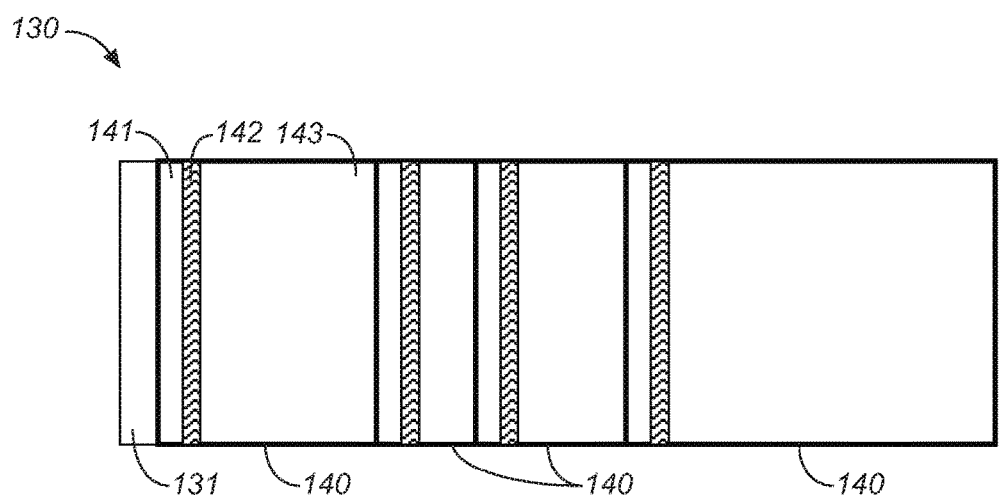

FIG. 1b shows an example structure of a metadata frame 130 (e.g. the metadata frame 112). The metadata frame 130 may comprise a frame header 131 which is indicative of generic information regarding the structure of the metadata frame 130 and the association of the metadata frame 130 with a content frame 111 of the coded bitstream 110. The frame header 131 may comprise some or all of the fields of the evolution frame of Table 1 which are not related to the payloads of the frame. Furthermore, the metadata frame 130 may comprise one or more blocks 140 of metadata (also referred to as metadata payload 140). A block 140 of metadata may comprise a block header 141, which may be indicative of the size of the block 140 of metadata (referred to as payload_size in Table 1). Furthermore, the block 140 of metadata may comprise a descriptor 142 (referred to as payload_config ( ) in Table 1), wherein the descriptor 142 may be indicative of the type of metadata and/or of one or more properties of the metadata, which is comprised in the data field 143 (i.e. the payload( ) shown in Table 1) of the block 140 of metadata.

An example descriptor 142 of a block 140 of metadata for an evolution frame, i.e. an example "payload_config( )" field, is shown in Table 2. It can be seen that the descriptor 142 may comprise or may be indicative of one or more properties of the metadata comprised within the block 140. In the example of Table 2, the properties are a timestamp parameter indicative of a sample of the audio content, to which the metadata of the block 140 is applicable. The timestamp may indicate a sample which is comprised within the content frame 111 that is associated with the metadata frame 112 of the block 140. Alternatively or in addition, the timestamp may be configured to take on sufficiently large values, to indicate a sample which is comprised within a content frame that is succeeding the content frame 111 which is associated with the metadata frame 112 of the block 140.

a duration parameter indicative of the number of samples (starting from the sample indicated by the timestamp), for which the metadata of the block 140 is applicable.

a transcoding flag (referred to as a "don't transcode" flag in Table 2) which provides an instruction to a transcoder on whether or not to transcode the block 140 of metadata. If the "don't transcode" flag is set, the transcoder may simply ignore or remove the block 140 of metadata when transcoding the inbound bitstream 110. This may be useful in case of metadata which is relevant only for the first codec system of the inbound bitstream 110, and does not make sense for any other codec system to which the bitstream 110 may be transcoded (as is the case e.g. for a cyclic redundancy check (CRC) which is generated over data comprised within the inbound bitstream 110. A CRC typically only makes sense, if the encoded data are not modified, so that there is no need to transcode the CRC). In more general terms, the transcoding flag may be used to identify metadata that is only useful during the decode process of the inbound bitstream within the transcoder (and therefore not required for the subsequent re-encode process for generating the outbound bitstream).

a duplicate flag which provides an instruction to a transcoder on whether or not to duplicate the metadata comprised within the block 140, when the size of the content frame 111 prior and subsequent to transcoding differs.

a de-duplicate flag which provides an instruction to a transcoder on whether or not to remove duplicates of the metadata comprised within the block 140, when the size of the content frame 111 prior and subsequent to transcoding differs.

a priority parameter which provides an indication of the relative importance of the metadata comprised within the block 140. The transcoder may use the priority parameter to select one or more blocks 140 from a metadata frame 130, e.g. if the allowed bit-rate of the transcoded second bitstream 120 is reduced with respect to the bit-rate of the first bitstream 110.

an association flag (referred to as the "now_or_never" flag in Table 2) which provides an indication to the transcoder on whether or not the metadata comprised within the block 140 is associated with the corresponding content frame 111. As such, if the "now_or_never" flag is set, the transcoder is aware of the fact that the metadata comprised within the block 140 should either be transcoded immediately or should be dropped (as the "now_or_never" flag indicates that the decoder cannot use the metadata if the metadata is delayed).

In other words, the semantics of the property parameters of the descriptor 142 shown in Table 2 may be as follows:

a timestamp parameter indicating the offset in samples from the beginning of the content frame 111 to which the payload 143 in question belongs;

a duration parameter indicating the time in samples for which the payload 143 in question remains valid;

a dont_transcode flag that signals whether the payload 143 in question must be discarded when transcoding (flag=1) or whether transcoding can occur (flag=0);

a duplicate flag that—when set to 1—signals that the payload 143 in question needs to be repeated during transcoding so that it appears in the transcoded blocks 140 between timestamp and timestamp+duration. The duplicate flag may be set, e.g. for loudness data to indicate that frames have the same dialnorm. In more general terms, the duplicate flag may be set for metadata that do not have a notion of time. The duplicate flag is typically not set for data that supports the concept of time by itself, like e.g. the bitstream of a codec. In other words, metadata that is internally timed may not be provided with a duplicate and/or de-duplicate flag which is set, wherein the term "internally timed" means that only the exact sequence of blocks of metadata is meaningful, i.e. a repetition or de-duplication would invalidate the metadata. An example for metadata which is internally timed is a different bitstream (different from the content comprised within the content frames) which is imbedded into a sequence of metadata blocks of a sequence of metadata frames. The payload of such a bitstream should never be repeated or de-duplicated. Otherwise, the bitstream would be repeated in parts or partially chopped. Another example for internally timed data is binary data, like an executable program. If such binary data is transmitted in multiple metadata blocks of multiple metadata frames, then the duplication or de-duplication of metadata blocks would invalidate the meaning of the binary data.

a de-duplicate flag: The de-duplicate flag may ensure that during transcoding, every block of metadata of a particular id within the same outbound metadata frame beyond the first that has this flag set to one may be deleted. The de-duplicate flag may be set e.g. for loudness data like dialnorm that does not need to be present multiple times per outbound metadata frame 122.

a "now_or_never" flag that indicates that a payload must not be delayed while transcoding.

a PCM processing parameter, referred to as a "tight_coupling" parameter in Table 2. The PCM processing parameter may e.g. be used in the context of a PCM-connected transcoder as described below, in order to inform the PCM-connected transcoder on how to handle the metadata of a particular metadata frame which is associated with a particular content frame, in case of a modification of the samples of the signal comprised within the content frame. The function of the PCM processing parameter will be described in further detail below, when describing the functions of a PCM-connected transcoder.

TABLE 2

| Syntax | No. of bits | Comments |
| --- | --- | --- |
| payload_config( ) | | |
| { | | |
|   timestamp_present; | 1 | |
|   if (timestamp_present) { | | |
|     timestamp = variable_bits (11); | | |
|   } | | |
|   duration_present; | 1 | |
|   if (duration_present) { | | |
|     duration = variable_bits (11); | | |
|   } | | |
|   dont_transcode; | 1 | |
|   if (!dont_transcode) { | | |
|     duplicate; | 1 | |
|     deduplicate; | 1 | |
|     priority; | 5 | |
|     now_or_never; | 1 | |
|     tight_coupling | 2 | |
|   } | | |
| } | | |

TABLE 3

| Syntax | No. of bits | Comments |
| --- | --- | --- |
| payload (id, size) | | |
| { | | |
|   for (i = 0; i < size; i++) { | | |
|     payload_bytes[i]; | 8 | |
|   } | | |
| } | | |

Table 3 shows the syntax of an example data field 143 of a block 140 of metadata.

As outlined above, the bitstream syntax for carrying metadata (i.e. the metadata frame 130 comprising a block 140 of metadata) may define generic metadata properties (e.g. comprised in the descriptor 142, i.e. in the payload_config( ) field shown in Table 2). These properties enable a simple copying of the metadata from one inbound (i.e. first) bitstream 110 to an outbound (i.e. second) bitstream 120, even if the first codec (used for encoding the inbound bitstream 110) and the second codec (used for encoding the outbound bitstream 120) use different framing. The way that the copying of the metadata is done is guided by the properties comprised within the descriptor 142. The only thing that might need to be changed during the transcoding process may be the properties themselves. However, the modification of the properties comprised within the descriptor 142 does not require knowledge about the actual meaning of the metadata comprised within the data field 143 of the block 140.

In the following, the example properties shown in Table 2 are described in more detail. In particular, it is described, how the transcoder 103 can make use of one or more of the properties indicated by the descriptor 142 for performing an efficient transcoding of the metadata comprised within a block 140 of metadata.

Figure 2A:
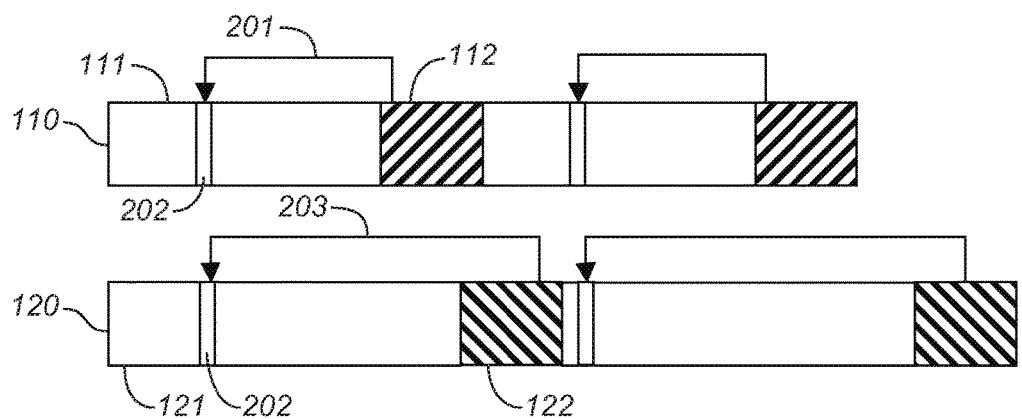
FIGS. 2a and 2b show examples of a timestamp property used in a metadata frame.
Figure 2B:
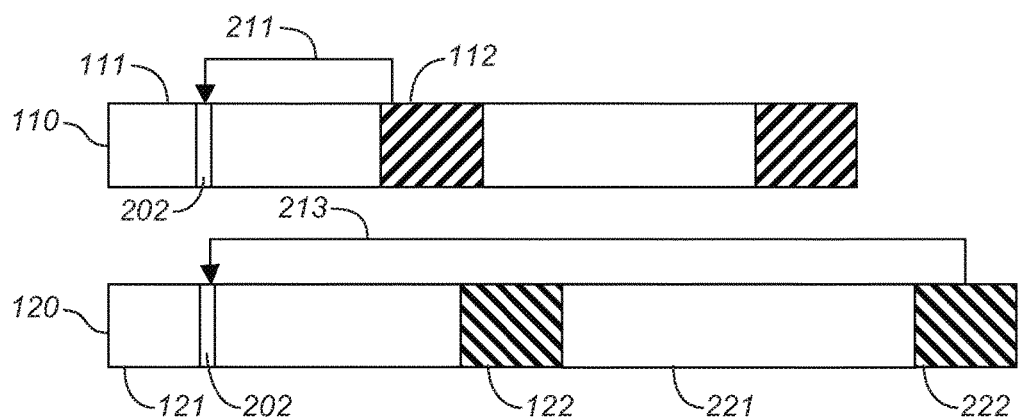

FIGS. 2*a* and 2*b* illustrate the use of the timestamp parameter comprised within the descriptor 142 of a block 140 of metadata. In FIG. 2*a* it is illustrated how the timestamp parameter 201 may be updated by a transcoder 103, when transcoding metadata from the first bitstream 110 to the second bitstream 120. In the illustrated example, the timestamp parameter 201 indicates the position of a particular sample 202 relative to the end of the associated content frame 111 (i.e. relative of the most recent sample). As such, the timestamp parameter 201 is indicative of a "delay" of the sample 202 with respect to the most recent sample comprised within the content frame 111. In the illustrated example of FIG. 2, the content frames 121 of the second bitstream 120 have a different, in particular a greater, size than the content frames 111 of the first bitstream 110. As a result of this, the particular sample 202 may be located at a different relative position within the content frame 121 of the second bitstream 120 compared to the relative position within the content frame 111 of the first bitstream 110. In particular, the particular sample 202 may exhibit a different "delay" with respect to the most recent sample comprised within the outbound content frame 121, than with respect to the most recent sample comprised within the inbound content frame 111. As a result of this, the timestamp parameter 201 comprised within the metadata frame 112 of the first bitstream 110 may need to be modified, when inserted into the metadata frame 122 of the second bitstream 120, thereby yielding the transcoded timestamp parameter 203.

FIG. 2*b* illustrates the possibility of moving metadata blocks 140 within the bitstream 110, 120. This may be useful, in order to smoothen the bit rate of the bitstream 120, subsequent to transcoding. By way of example, the metadata of a particular block 140 in the metadata frame 112 may be associated with the particular sample 202 in the content frame 111 (indicated by the timestamp parameter 211). As outlined above, the location of the particular sample 202 may be indicated relative to the last, i.e. the most recent, sample of the inbound content frame 111. If it is not essential that the metadata of the particular block 140 arrives directly subsequent to the content frame 121 comprising the sample 202 (as may be indicated by the association flag (referred to as "now-or-never" flag in Table 2), the particular block 140 may be moved by the transcoder to a metadata frame 222 of a content frame 221 which is subsequent to the content frame 121 comprising the sample 202. The transcoder 103 may update the timestamp parameter 213 such that it points to the correct sample 202.

In particular, the timestamp parameter 213 may indicate the location of the sample 202 relative to the last, i.e. the most recent, sample of the outbound content frame 221 that the outbound metadata frame 222 which comprises the timestamp parameter 213 is associated with. For this purpose, the timestamp parameter 213 may take on values which exceed the number of samples comprised within a content frame 221. In a similar manner, the timestamp parameter 213 may be configured to take on negative values. Such negative values could be used to indicate a sample 202 which is comprised in a future content frame, i.e. in a content frame which is subsequent to the content frame 221 associated with the metadata frame 222 comprising the timestamp parameter 213. By doing this, metadata may be transmitted prior to the one or more samples that it is associated with (e.g. that it is to be applied to).

As such, the timestamp parameter 211 (possibly in combination with the association flag) enables a transcoder 103 to transmit the metadata associated with a timestamp 211 in a subsequent or preceding metadata frame 222 and adjust the timestamp 213 such that it refers to the same PCM sample 202 (even though after transcoding, the sample 202 is not comprised in the content frame 221 which is associated with the metadata frame 222 which comprises the particular block 140). As a result of this, the transcoder 103 is provided with some flexibility to smoothen the bit-rate of the second bitstream 120.

It should be noted that—in a similar manner to the transcoder 103—the encoder 101 may be configured to include metadata for a sample into a subsequent metadata frame. As such, the encoder 101 may be configured to generate a timestamp 213 which points to a sample 202 which is comprised in a content frame 121 that is not the content frame that the metadata frame comprising the timestamp 213 is associated with.

Figure 3A:
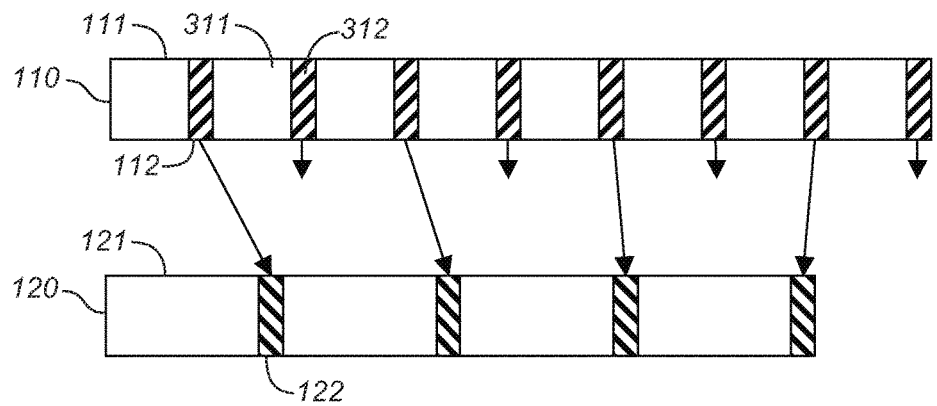
FIGS. 3a and 3b show examples of a de-duplication property used in a metadata frame.
Figure 3B:
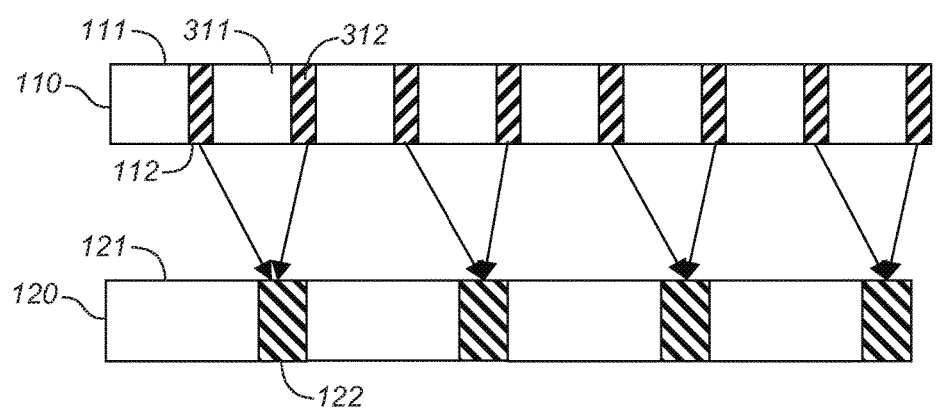

FIGS. 3*a* and 3*b* illustrate possible use cases of the de-duplicate flag indicated by the descriptor 142 of a block 140 of metadata. In the illustrated cases, the content frames 121 of the second bitstream 120 represent a higher number of samples (i.e. have a higher frame size) than the content frames 111 of the first bitstream 110. If the frame sizes differ, situations may occur where a single content frame 121 of the second bitstream 120 comprised samples from more than one content frame 111 of the first bitstream 110. In such cases, blocks 140 of metadata may be available from the more than one metadata frame 112 associated with the more than one content frame 111 of the first bitstream 110. The transcoder 103 has to decide which of the blocks 140 of metadata are to be included in the single metadata frame 122 of the single content frame 121 of the second bitstream 120.

The de-duplicate flag of a particular block 140 may indicate to the transcoder 103 that the particular block 140 does not need to be inserted into a metadata frame 122 of the second bitstream 120, if metadata blocks 140 from a plurality of metadata frames 112 of the first bitstream 110 are to be merged. As such, the transcoder 103 may be configured to drop or ignore the metadata blocks 140 of additional metadata frames 112, for which the de-duplicate flag is set.

This is illustrated in FIG. 3*a*, where the outbound content frame 121 (i.e. the content frame 121 of the outbound bitstream 120) comprises the samples of the inbound content frames 111 and 311 (i.e. of the content frames 111, 311 of the inbound bitstream 110). The transcoder 103 has to decide which of the blocks 140 of the inbound metadata frames 112, 312 (i.e. of the metadata frames 112, 312 of the inbound bitstream 110) are to be included into the outbound metadata frame 122 (i.e. of the metadata frame 122 of the outbound bitstream 120) associated with the outbound content frame 121. In the illustrated example of FIG. 3a, it is assumed that the de-duplicate flag is set at least for the one or more blocks 140 of the inbound metadata frame 312. As such, the transcoder 103 may be configured to drop the blocks 140 of the inbound metadata frame 312.

It should be noted that the de-duplication flag of the one or more blocks 140 of the inbound metadata frame 112 may also be set. The transcoder 103 may be configured to only drop the blocks 140 of a second (or more) metadata frame 312 used to build the outbound metadata frame 122. In other words, the transcoder 103 may be configured to consider the de-duplicate flag only if more than one inbound metadata frame 112 is to be considered for generating an outbound metadata frame 122. As such, the de-duplicate flag may be used to prevent "duplicates" of a particular type of metadata block 140, while still ensuring that at least one metadata block 140 of the particular type is included.

FIG. 3b illustrates an example case, where the de-duplicate flag is not set. In this case, the transcoder 103 may be configured to consider the blocks 140 of the plurality of inbound metadata frames 112 and 312 for building the outbound metadata frame 122. In particular, the transcoder 103 may be configured to insert a block 140 from the inbound metadata frame 312 into the outbound metadata frame 122, if the de-duplicate flag is not set (even in situations, where the outbound metadata frame 122 is generated from a plurality of inbound metadata frames 112, 312).

The de-duplicate flag may e.g. be used to identify metadata blocks 140 which are inserted into a plurality of succeeding metadata frames 112, 312 (e.g. into every metadata frame 112, 312 of a bitstream 110). As such, the de-duplicate flag enables a transcoder 103 to easily identify metadata blocks 140 which may be discarded (without the need of analyzing the metadata stored in the data field 143 of the metadata block 140). As a result, the computational complexity for transcoding metadata is reduced. On the other hand, a de-duplicate flag which is not set indicates that a corresponding block 140 of metadata should not be dropped. This may be used for auxiliary data, in order to ensure that the auxiliary data is not dropped, even if a plurality of inbound metadata frames 112, 312 are transcoded into a single outbound metadata frame 122.

Figure 4A:
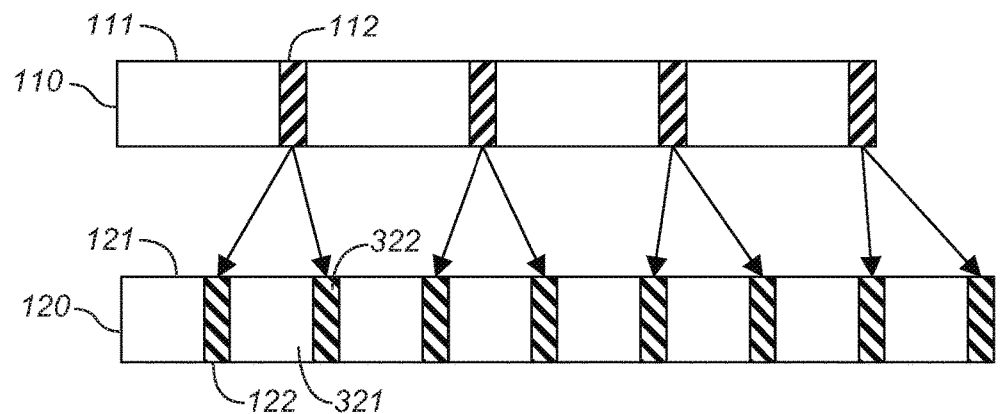
FIGS. 4a and 4b show examples of a duplication property used in a metadata frame.
Figure 4B:
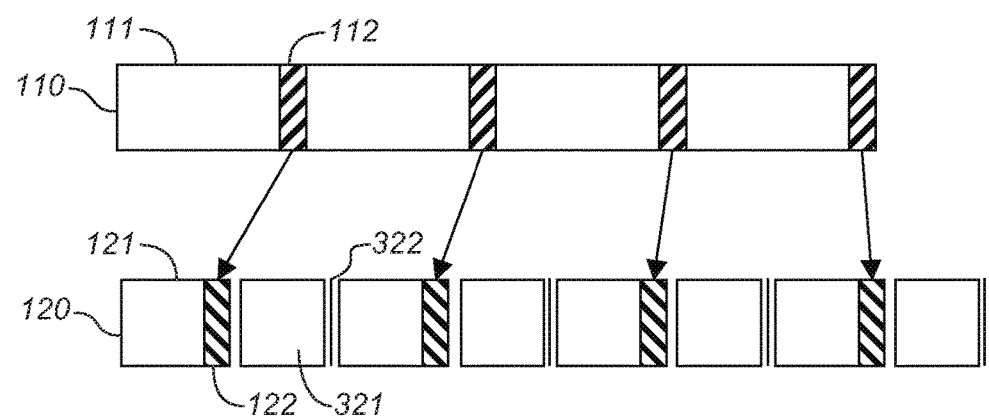

FIGS. 4a and 4b illustrate an example usage of the duplicate flag indicated in the descriptor 142 of a block 140 of metadata. In the illustrated case, the inbound content frame 111 comprises a higher number of samples (i.e. has a larger frame size) than the outbound content frame 121. If the frame sizes differ, situations may occur where the samples of a single inbound content frame 111 are comprised within more than one outbound content frame 121, 321. As a consequence, the transcoder 103 receives a single inbound metadata frame 112 and has to decide in which one of the plurality of outbound metadata frames 122, 322 to place a particular block 140 of metadata. The duplicate flag may be used to indicate to the transcoder 130 whether or not to duplicate a particular block 140 from the inbound metadata frame 112. By setting the duplicate flag, it may be indicated that the metadata comprised within the block 140 should be comprised within every outbound metadata frame 122, 322, as is shown in FIG. 4a. On the other hand, an unset duplicate flag indicates that the metadata block 140 should only be transmitted once. As such, the transcoder 103 inserts the block 140 from inbound metadata frame 112 only into a single one of the plurality of outbound metadata frames 122, 322 (as illustrated in FIG. 4b).

As outlined above, the descriptor 142 of a block 140 of metadata may be indicative of an association flag (referred to as the "now_or_never" flag in Table 2). The association flag may indicate that the metadata comprised within the block 140 may be delayed without impacting the content comprised in the associated content frame. As such, the syntax of the descriptor 142 may enable a transcoder 103 to delay metadata by an arbitrary amount of time, if this is one property of the metadata. This may be indicated by setting the flag now_or_never to 0. The association flag enables the transcoder 103 to transmit the metadata which is comprised within the block 140 e.g. when the underlying audio codec can "afford" the transmission of the metadata, e.g. when the content frames comprise silence. One example of metadata which may be delayed is auxiliary data or binary data, like a firmware upgrade, which does not need to be transmitted along with a particular content frame 121.

As described in the context of Table 2, the descriptor 142 of a block 140 of metadata may be indicative of or may comprise a priority property or a priority parameter. The priority parameter may indicate a relative importance of the metadata of a particular block 140 (e.g. relative to the importance of other blocks 140). A transcoder 103 can decide to only transcode a certain number of metadata blocks 140 and to discard all other metadata blocks in the metadata frame 112. This may e.g. be required when transcoding from a higher bit-rate inbound bitstream 110 to a lower bit-rate outbound bitstream 120. The priority parameter may enable the transcoder 103 to select those blocks 140 of an inbound metadata frame 112 having the relative highest priorities and to discard (or delay) those blocks 140 having relative lower priorities.

Applications and/or encoders 101 may provide multiple sets of metadata in the same metadata frame 112, each with a different priority. The multiple sets of metadata may be associated with different qualities of metadata. The priority of higher quality metadata may be lower than the priority of lower quality metadata. As such, the transcoder 103 may be configured to degrade the quality of the metadata by considering the priority parameter. By way of example, if priorities are set in a way such that scalability is possible, i.e. every metadata set can be applied if all metadata sets of the same application of a higher priority are transmitted, then a transcoder can gracefully degrade the quality of the metadata without having to know about the meaning of the metadata. In particular, the multiple sets of metadata may comprise incremental metadata, i.e. each set of metadata may add some quality to the set of metadata with the next highest priority. The highest quality of metadata may then be provided by combining all sets of metadata (from the highest priority down to the lowest priority). As such, an inbound metadata frame 112 may comprise a plurality of blocks 140 of incremental metadata, wherein the block 140 of metadata with the highest priority comprises a version of the metadata with minimum acceptable quality and wherein the blocks 140 with successively lower priority comprise incremental versions of metadata which allow to incrementally increase the quality of the metadata. As such, the transcoder 103 may decide on the quality of metadata which is included into the second bitstream 120 by considering the priority parameters of the plurality of blocks 140 of incremental metadata.

As indicated in the example syntax of a metadata frame 112 shown in Table 1, the metadata frame 130 may comprise a protection field. The protection field may be used to enable the decoder 104 to verify whether the content of the metadata frame 130 and/or the content of the associated content frame has been modified and may therefore be invalid. In other words, the protection field may allow a decoder 104 to verify whether the metadata comprised within a metadata frame 130 and/or within an associated content frame is trustworthy or not. Table 4 shows an example syntax of a protection field of a metadata frame 130. The protection field may be comprised within the header 131 of the metadata frame 130.

TABLE 4

| Syntax | No. of bits | Comments |
|---|---|---|
| protection( ) |  |  |
| { |  |  |
|   protection_config_frame; | 2 |  |
|   protection_config_history; | 2 |  |
|   switch (protection_config_frame) { |  |  |
|     case 0: |  |  |
|       protection_bits_frame; | 0 |  |
|       break; |  |  |
|     case 1: |  |  |
|       protection_bits_frame; | 8 |  |
|       break; |  |  |
|     case 2: |  |  |
|       protection_bits_frame; | 32 |  |
|       break; |  |  |
|     case 3: |  |  |
|       protection_bits_frame; | 128 |  |
|       break; |  |  |
|   } |  |  |
|   switch (protection_config_history) { |  |  |
|     case 0: |  |  |
|       protection_bits_history; | 0 |  |
|       break; |  |  |
|     case 1: |  |  |
|       protection_bits_history; | 8 |  |
|       break; |  |  |
|     case 2: |  |  |
|       protection_bits_history; | 32 |  |
|       break; |  |  |
|     case 3: |  |  |
|       protection_bits_history; | 128 |  |
|       break; |  |  |
|   } |  |  |
| } |  |  |

The semantics of the protection field may be as follows:
protection_bits_frame may comprise the truncated protection payload of the current frame (comprising the content frame and/or the associated metadata frame).
protection_bits_history may comprise the truncated protection payload of the current frame and of the frame(s) before the current frame (comprising the content frame and/or the associated metadata frame). An example scheme for securing a sequence of frames is described in WO2011/015369, the content of which is incorporated by reference.

As such, the protection field may comprise one or more cryptographic values. One of the cryptographic values may be generated based on the metadata comprised within a current metadata frame (comprising the protection field) and/or based on the content frame associated with the current metadata frame. As such, it may be ensured that an isolated content frame and/or the associated content frame are not modified. Another one of the cryptographic values may be generated based on the metadata comprised within the current metadata frame and within one or more preceding metadata frames (as well as on the respective associated content frames). As such, it may be ensured that sequences of content frames and/or metadata frames are not modified.

A cryptographic value may be determined at an encoder 101 by applying a one-way function to a group of one or more metadata frames 112, 312 and/or the associated content frames 111, 311. In particular, a cryptographic value may be generated using a key value and a cryptographic hash function (the so called one-way function). In particular, the cryptographic value may be generated by calculating an HMAC-MD5 (hash message authentication code) value for the data comprised within one or more metadata frames 112, 312 and for the data comprised within the one or more associated content frames 111, 311.

Furthermore, the generation of the cryptographic value may comprise truncating of the HMAC-MD5 value, e.g. truncating to 16, 24, 32, 48, 64 or 128 bits. The truncation may be beneficial in view of reducing the required overhead for the cryptographic value in the encoded bitstream 110 comprising the metadata frames 112, 312. It should be noted that other hash functions, such a SHA-1 or SHA-256, may be used instead of MD5.

Furthermore, it should be noted that the encoder 101 may be configured to transmit zero bits of a cryptographic value, i.e. to transmit no cryptographic value, e.g. in situation where no protection of the metadata is required.

In more detail, the cryptographic value for one or more content frames 111, 311 and of one or more metadata frames 112, 312 may be determined by using a cryptographic hash function H(.) and a "secret" key K (also referred to as security key) which is typically padded to the right with extra zeros to the block size of the hash function H(.) to determine a hash message authentication code (HMAC) of the one or more content frames 111, 311 and of one or more metadata frames 112, 312. Let the ∥ sign denote a concatenation and the ⊕ sign denote an exclusive or, and the outer padding opad=0x5c5c5c . . . 5c5c and the inner padding ipad=0x363636 . . . 3636 be constants of the length of the block size of the hash function H(.), then the HMAC value of the one or more content frames 111, 311 and of one or more metadata frames 112, 312 may be written as $$HMAC(m) = H((K \oplus opad) \| H((K \oplus ipad) \| m)),$$

where m is the combined bit sequence of the one or more content frames 111, 311 and of one or more metadata frames 112, 312. The block size used with MD5 or SHA-1 or SHA-256 hash functions is typically 512 bits. The size of the output of the HMAC operation is the same as that of the underlying hash function, i.e. 128 bits in case of MD5 or 160 bits in case of SHA-1.

As such, the protection field may comprise at least two cryptographic values
  a frame cryptographic value (referred to as "protection_bits_frame" in Table 4) which is indicative of the authenticity of an individual content frame 111 and its associated metadata frame 112. The frame cryptographic value may be used to identify whether the data of the individual content frame 111 and its associated metadata frame 112 has been changed. The frame cryptographic value may be determined using a message m which comprises the bit sequence of the individual content frame 111 and of its associated metadata frame 112 (or of the payload comprised within the individual content frame 111 and of its associated metadata frame 112.
  a history cryptographic value (referred to as "protection_bits_history" in Table 4) which is indicative of the authenticity of a sequence of at least two content frames 111, 311 and their associated at least two metadata frames 112, 312. The history cryptographic value may be used to identify whether the sequence of the at least two content frames 111, 311 and their associated metadata frames 112, 312 has been changed. The history cryptographic value may be determined using a message m which comprises the bit sequence of the at least two content frames 111, 311 and their associated at least two metadata frames 112, 312 (or of the payload comprised therein).

As outlined above, the cryptographic values are determined using a secure key K, which is typically known only to the encoder 101 and the decoder 104. In the present document, it is proposed to enable multiple levels of trust by allowing the use of different secure keys K providing different levels of trust. By way of example, at least two levels of trustworthy keys may be provided a highly secure key $K_1$, which may not be disclosed to any parties outside of the entity which provides the components 101, 103, 104 along a distribution chain 100. Such an entity may be a provider of the codec systems used along the distribution chain 100 (e.g. Dolby Laboratories). In particular, such an entity may be the provider of the encoders and the decoders used along the distribution chain 100. By keeping the highly secure key undisclosed, it can be ensured that a decoder 104 which renders the audio signal comprised within the received bitstream 120 can be certain that the metadata comprised within the metadata frames 122, 322 of the received bitstream 120 is authentic and has not been modified in an unauthorized manner along the distribution chain 100.

a moderate secure key $K_2$, which may be disclosed to other parties, e.g. parties operating some of the components 101, 103, 104 along the distribution chain 100 (e.g. licensees of the provider of the codec systems). If the decoder 104 receives a bitstream 120 which has been protected using the moderate secure key $K_2$, the decoder 104 knows that the bitstream 120 comprises metadata (in the metadata frames 122, 322) which has been handled in accordance to some policies of the operator of the distribution chain 100, which may be different from the policies of the provider of the codec systems (holding the highly secure key $K_1$)

An indication of the secure key K used by the encoder 101 may be provided within a metadata frame 130 (e.g. within the header 131 of the metadata frame 130). This is illustrated in Table 1 which shows the key_id parameter. The key_id parameter may comprise an index to a pre-determined number of secure keys, thereby allowing the decoder 104 to determine the secure key K, which was used to determine the one or more cryptographic values, wherein the one or more cryptographic values may be comprised in the protection( ) field of the metadata frame 130, as shown in Table 4). The decoder 104 may then use the identified secure key to determine the one or more cryptographic values in the same manner as done by the corresponding encoder 101. The cryptographic values which are determined by the decoder 104 may be referred to as the verification cryptographic values. The verification cryptographic values are then compared with the cryptographic values stored in the metadata frame 103. In case of a match, it is confirmed that the individual frame and/or that the sequence of frames has not been modified. On the other hand, in case of a mismatch, it is confirmed that the individual frame and/or that the sequence of frames has been modified.

Alternatively or in addition to providing an indication of the secure key within the metadata frame 130, the decoder 104 may be configured to determine a plurality of sets of verification cryptographic values using a plurality of pre-determined secure keys known to the decoder 104. If one of the sets of verification cryptographic values matches the cryptographic values comprised in the metadata frame 130, the decoder 104 knows which secure key has been used and that the individual frame and/or that the sequence of frames has not been modified. On the other hand, a mismatch for all sets of verification cryptographic values indicates that the individual frame and/or that the sequence of frames has been modified.

Being able to detect which key was used to secure a bitstream 110, 120 in decoders 104 and transcoders 103 enables applications to make finer grained decisions on what to do with data of different trustworthiness. Decisions might be different depending on the detected secure key. In particular, the highly secure key may be detected, the moderate secure key may be detected or no valid key may be detected and the security check may not pass.

As such, levels of trustworthiness may be provided when using a plurality of different secure keys (which are attached to different levels of trust), compared a solution which only uses a single secure key, where only a binary decision can be made on whether data can be trusted or not.

As described in the context of FIG. 1, a distribution chain 100 for audio content may comprise a transcoder 103 which is configured to convert an inbound bitstream 110 into an outbound bitstream 120. The transcoding performed by the transcoder 103 may relate to the transcoding from a first audio codec system to a second, possibly different, audio codec system. Alternatively or in addition, the transcoding may relate to a change of the bit-rate of the outbound bitstream 120 with respect to the bit-rate of the inbound bitstream 110. The transcoder 103 may comprise a decoder for decoding the inbound bitstream 110 into a PCM (pulse code modulated) audio signal. Furthermore, the transcoder 103 may comprise an encoder for encoding the PCM audio signal into the outbound bitstream 120. Such a transcoder 103 may be referred to as a "PCM-connected" transcoder, as the one or more decoders (for decoding the one or more inbound bitstreams 110) are connected to the one or more encoders (for encoding the one or more outbound bitstreams 120) via linear PCM.

The transcoder 103 may be a so called professional transcoder which is a device used by professional content providers such as broadcasters. As outlined above, the transcoder 103 may be configured to accept the inbound bitstream 110 in a first format (e.g. Dolby E) and to transcode the inbound bitstream 110 into a different format (e.g. Dolby Digital Plus). Such transcoders 103 typically incorporate one or more decoders (for decoding the inbound bitstream 110) and one or more encoders (for encoding the outbound bitstream 120).

A PCM-connected transcoder may have one or more PCM processing stages between the decoder and the encoder. Loudness leveling is one example of such PCM processing. Other examples of PCM processing are sample rate conversion, channel downmixing, and/or channel upmixing.

Such PCM-connected transcoders 103 pose a challenge with regards to authenticity, protection and trust issues outlined above. As outlined above, an inbound bitstream 110 may comprise metadata frames 112, 312 which are protected using one or more cryptographic values (comprised e.g. in the protection field of the metadata frames 112, 312 as shown in Tables 1 and 4). A PCM-connected transcoder 103 allows a user to modify PCM data derived from the content frames 111, 311, thereby possibly invalidating the metadata comprised within the associated metadata frames 112, 312, and thereby possibly compromising the trustworthiness of the metadata.

In the present document, a method and a system for ensuring the trustworthiness of metadata in a transcoder 103 is described. In particular, the described method and system allow the trustworthiness of metadata comprised in metadata frames 112, 312 to be maintained, even when using a PCM-connected transcoder 103.

FIGS. 5a to 5d show example PCM-connected transcoders 503, 513, 523, 533, respectively. The transcoders comprise a decoder 504 which is configured to convert the inbound bitstream 110 (which comprises a sequence of content frames 111 and a sequence of associated metadata frames 112) into PCM data and metadata, respectively. The decoder 504 may be configured to verify the correctness of the inbound bitstream 110 using the protection scheme outlined above. For this purpose, the decoder 504 may be aware of some or all of the pre-determined secure keys.

Typically, a decoder 504 provides an unprotected set of PCM data and metadata (e.g. on a frame by frame basis). In other words, the decoder 504 typically decodes each content frame 111 and associated metadata frame 112 and provides the respective set of PCM data and metadata without protection. As such, the decoder 504 provides a sequence of sets of PCM data and metadata from a corresponding sequence of content frames 111 and metadata frames 112. The sequence of sets of PCM data and metadata may be modified by the transcoder and may then be passed to an encoder 501 which is configured to convert the sequence of (possibly modified) sets of PCM data and metadata to the outbound bitstream 120. In this context, the encoder 501 is typically not able to verify whether the sequence of (possibly modified) sets of PCM data and metadata has been modified in a sensible manner. In other words, the encoder 501 may not verify the trustworthiness of the sequence of (possibly modified) sets of PCM data and metadata.

In the present document, it is proposed to enable the decoder 504 to provide one or more signature values based on one or more sets of PCM data and metadata, thereby allowing the protection of the PCM connection between the decoder 504 and the encoder 501. The signature values may be determined in a similar manner to the cryptographic values, as described above. However, the signature values may make use of a message m which comprises one or more sets of PCM data and metadata (in contrast to one or more content frames and associated metadata frames). In particular, the decoder 504 may be configured to determine a frame signature value based on an individual set of PCM data and associated metadata; and a history signature value based on two or more sequential sets of PCM data and associated metadata.

In other words, within the PCM domain of a PCM-connected transcoder 503 (i.e. between the decoder 504 and the encoder 501), the trustworthiness of the content may be "protected" using one or more signatures (also referred to as signature values). The decoder 504 may be configured to produce one or more signature values as an output. The one or more signature values may be calculated over the union of PCM data and regular metadata (taken from the content frame) and additional metadata (taken from the associated metadata frame), as produced by the decoder 504. As such, for each frame of the inbound bitstream 110, one or more signature values may be determined based on the decoded sets of PCM data and metadata. These one or more signature values may be used by the corresponding encoder 501 to verify whether a received set of PCM data and metadata has been modified or not, and/or is trustworthy or not.

The encoder 501 accepts the one or more signature values as an input, along with PCM data, regular metadata and the additional metadata. The encoder 501 may then check the signature values against the other inputs (i.e. against the received set(s) of PCM data and metadata). If the other inputs have been modified/tampered, the signature check will fail and the encoder will take appropriate action. The verification of the one or more signature values may be performed at the encoder 501 by determining verification signature values based on the received one or more sets of PCM data and metadata (in a similar manner, as described for the cryptographic values).

As such, the trustworthiness of the decoded PCM data (and the associated metadata) may be maintained within a PCM-connected transcoder 503 by enabling the decoder 504 to determine one or more signature values based on the decoded PCM data and the associated metadata and by enabling the corresponding encoder 501 to verify the authenticity of the to-be-encoded PCM data (and the associated metadata) based on the one or more signature values. The determination of the one or more signature values and its verification may be performed based on a single or based on a plurality of leveled security keys $K_1$ and $K_2$, as outlined above, wherein the one or more security keys may only be known to the decoder 504 and the encoder 501, and are typically unknown to an entity performing PCM processing on the connection between the decoder 504 and the encoder 501.

Figure 5A:
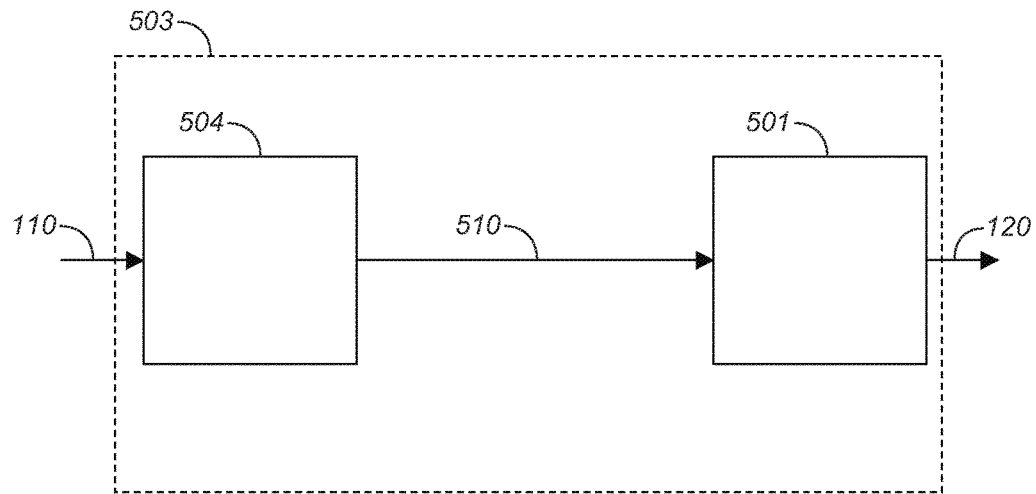
FIGS. 5a to 5d and FIG. 6 show example PCM-connected transcoders.

The use of one or more signature values allows the implementation of various use cases as illustrated in FIGS. 5a to 5d. FIG. 5a illustrates a transcoder 503, where no PCM processing is performed between the decoder 504 and the encoder 503. As a consequence, the protected data 510 (comprising one or more sets of PCM data and associated metadata, as well as one or more associated signatures) is not modified and the chain of trust is maintained within the transcoder 503. As a result, the transcoder 503 of FIG. 5a is configured to receive an inbound bitstream 110 comprising a protected and trusted sequence of inbound content frames 111 and associated inbound metadata frames 112 (also referred to as evolution frames), and to provide an outbound bitstream 120 which comprises a protected and trusted sequence of outbound content frames 121 and associated outbound metadata frames 122. This is ensured by protecting the decoded PCM data, the regular metadata and the additional metadata (also referred to as evolution metadata) using one or more signatures. The encoder 501 verifies the one or more signatures and passes the additional metadata as outbound metadata frames 122 to the outbound bitstream 120. The use case shown in FIG. 5a may e.g. be applicable to the transcoding of a bitstream from a first bit-rate to a second bit-rate.

Figure 5B:
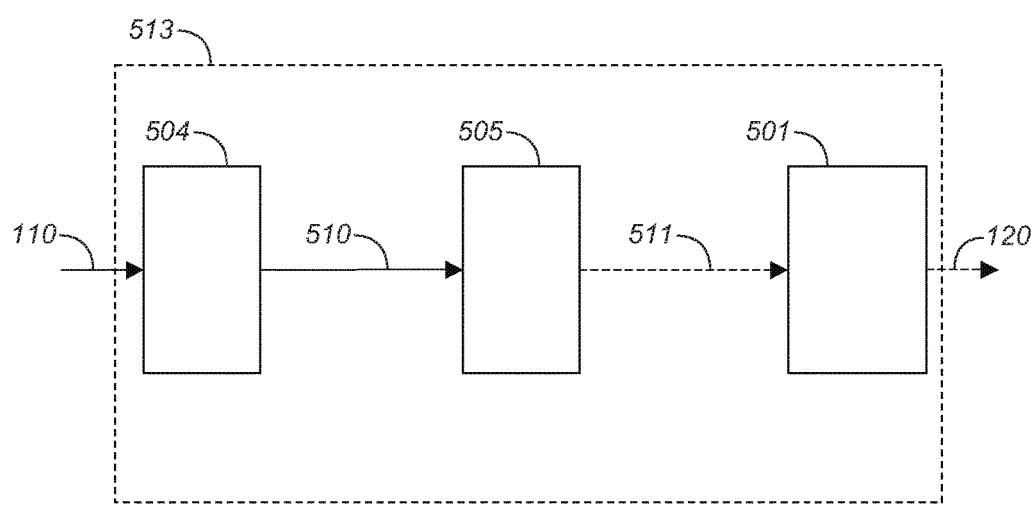

FIG. 5b shows a PCM-connected transcoder 513 where the chain of trust is broken by an untrusted PCM processing stage 505. The PCM processing stage 505 receives the protected data 510 and modifies the data 510. The PCM processing stage 505 is "untrusted" in that the PCM processing stage 505 in not aware of the secure key K used by the decoder 504. As a consequence, the modified data 511 comprises one or more sets of modified PCM data and associated metadata, as well as one or more invalid signatures. The encoder 501 is configured to determine the invalidity of the signatures and may be configured to take appropriate action. In particular, the encoder 501 may be configured to drop the additional metadata from the inbound metadata frames 112, thereby providing an outbound bitstream 120 which only comprises a sequence of content frames 121, but which does not comprise the associated metadata frames 122. By doing this, it is ensured that the transcoder 513 does not forward untrusted additional metadata. Furthermore, due to the fact that the bitstream 120 does not comprise metadata frames 122, the bitstream 120 does not comprise the above mentioned cryptographic values (from the protection fields of the metadata frames 122). As such, the bitstream 120 can be identified by a decoder 104 as being untrusted.

As indicated above, the encoder 501 may be configured to drop the additional metadata from the inbound metadata frames 112, if the one or more signature values are not valid. As outlined in the context of Table 2, the metadata blocks 140 of an inbound metadata frame 112 may be indicative of respective descriptors 142 which describe one or more properties of the corresponding metadata blocks 140. One of these properties may be the PCM processing parameter (referred to as tight_coupling parameter in Table 2). The encoder 501 may be configured to use the PCM processing parameter of a metadata block 142, in order to decide on whether or not to include the metadata comprised within the metadata block 142 into the outbound bitstream 120. In particular, the PCM processing parameter may indicate to the encoder 501 to include metadata from a block 140 of the inbound metadata frame 112 into the outbound bitstream 120, even though the PCM samples of the associated content frame 111 have been modified.

Table 5 shows example semantics of the PCM processing parameter (i.e. of the tight_coupling parameter of Table 2). In the illustrated example, a value "0" of the PCM processing parameter indicates that the payload 143 (i.e. the metadata) of a block 140 of metadata should be included into the outbound bitstream 120 only if no PCM processing occurred, e.g. only if the one or more signature values have been verified by the encoder 501. On the other hand, a value "3" of the PCM processing parameter may indicate that the payload 143 of the block 140 should always be included into the outbound bitstream 120, even if the PCM samples have been modified, e.g. even if the one or more signature values have not been verified. Furthermore, the PCM processing parameter may take on values which indicate intermediate situations, i.e. the PCM processing parameter may take on values which indicate the PCM processing conditions that need to be met for payload 143 to be included into the outbound bitstream 120 or which indicate the PCM processing conditions, in case of which the payload 143 is not included into the outbound bitstream 120.

The PCM processing stage 505 may be configured to inform the encoder 501 on the processing which has been performed on the PCM samples in the PCM processing stage 505. In other words, the PCM processing stage 505 may be configured to inform the encoder 501 about the PCM processing conditions (e.g. conversion of the sampling rate of the PCM samples, inclusion of a system sound into the PCM samples, modification of the metadata, modification of a channel configuration (e.g. modification of a mono signal to a stereo signal, or downmixing of a 5.1 multi-channel signal to a stereo signal), leveling of the loudness, etc.). As such, the encoder 501 may be configured to receive indications of the PCM processing conditions from the PCM processing stage 505. Furthermore, the encoder 501 may be configured to process the metadata of a block 140 of metadata, based on the received PCM processing conditions and based on the value of the PCM processing parameter (e.g. in accordance to the semantics of Table 5).

TABLE 5

| | |
|---|---|
| 0 | keep payload only if no PCM processing occurred |
| 1 | keep payload if one or more of the following changes to PCM occurred: |
| | the sampling rate has been converted |
| 2 | keep payload if one or more of the following changes to PCM occurred: |
| | Any of the changes mentioned for case "1" above |
| | system sounds are mixed into PCM |
| | metadata have been modified |
| | the channel configuration has been changed |
| | loudness has been levelled |
| 3 | keep payload regardless of any PCM processing performed |

Figure 5C:
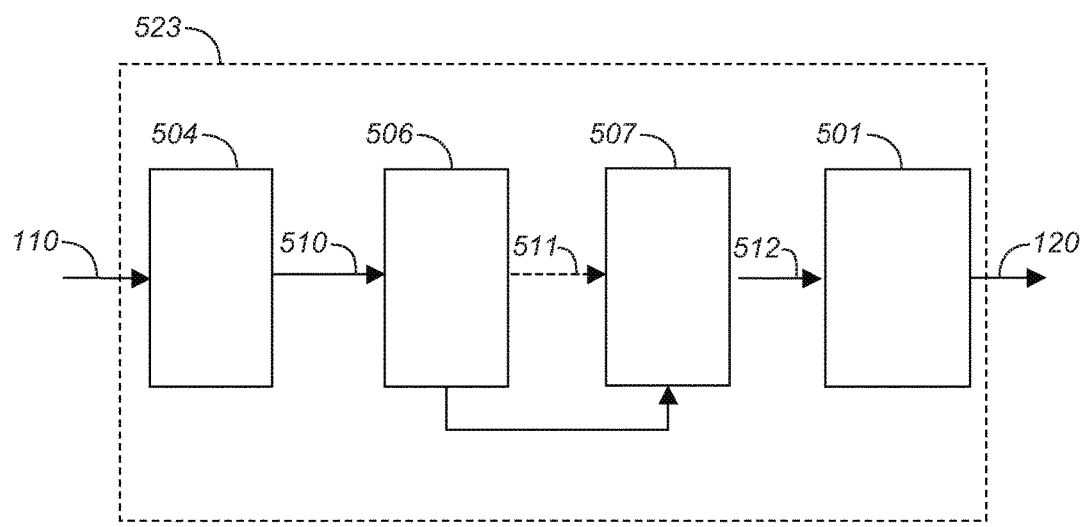

FIG. 5c illustrates the case of a PCM-connected transcoder 523 which is configured to perform trusted PCM processing. This may be achieved by combining the PCM processing stage 506 with an additional re-signing stage 507. For this purpose, a trusted party may be provided with one or more of the secure keys, thereby enabling the trusted party to re-sign the modified data 511. By way of example, the trusted party may be provided with the moderate secure key $K_2$. As a result of this, the modified data 511 may be re-signed (i.e. one or more signature values may be determined based on the modified data 511 using the moderate secure key $K_2$), thereby providing the protected modified data 512 (comprising a sequence of sets of modified PCM data and associated metadata, as well as the one or more new signatures). The encoder 501 may be configured to verify the new signature and generate the trusted outbound bitstream 120 comprising the sequence of content frames 121 and the associated sequence of metadata frames 122. Furthermore, the encoder 501 may be configured to determine that the chain of trust has been broken and that a new chain has been created, because the re-signing stage 507 may have used a different secure key (e.g. the moderate secure key $K_2$) than the decoder 504 (which may have used the highly secure key $K_1$).

Figure 5D:
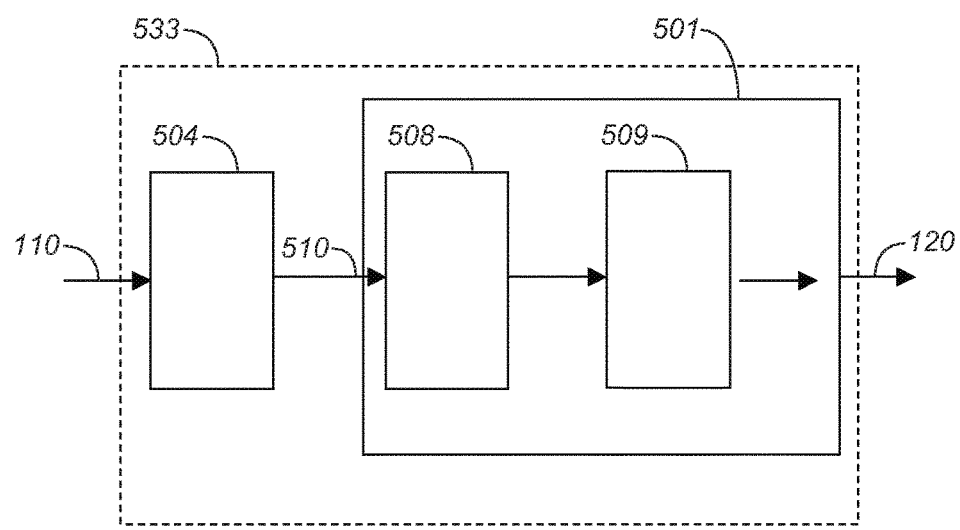

FIG. 5d shows a block diagram of a PCM-connected transcoder 533 with a PCM processing stage 509 comprised within the encoder 501. In particular, the transcoder 533 is configured to maintain a chain of trust by ensuring that the PCM processing is performed by an entity (e.g. the encoder 501) which is aware of the secure key used by the decoder 504 to determine the one or more signature values. The encoder 501 is configured to verify the one or more signatures of the protected data 510. The internal PCM processing stage 508 may then modify the received sets of PCM data and associated metadata. Furthermore, the encoder 501 may comprise a metadata update unit 509 which is configured to update the metadata frames, subject to the modifications performed in the PCM processing stage 508. In particular, the metadata update unit 509 may be configured to determine updated cryptographic values based on the transcoded content frames 121 and metadata frames 122. The updated cryptographic values may then be included into the metadata frames 122 for communication to the decoder 104.

Figure 6B:
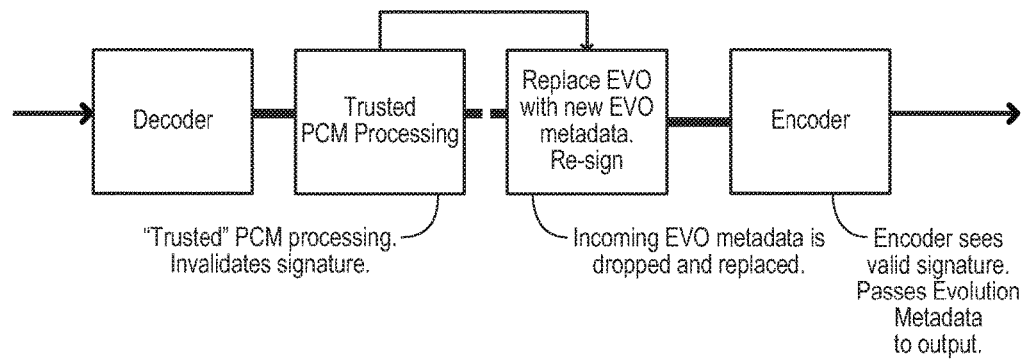
Figure 6B:
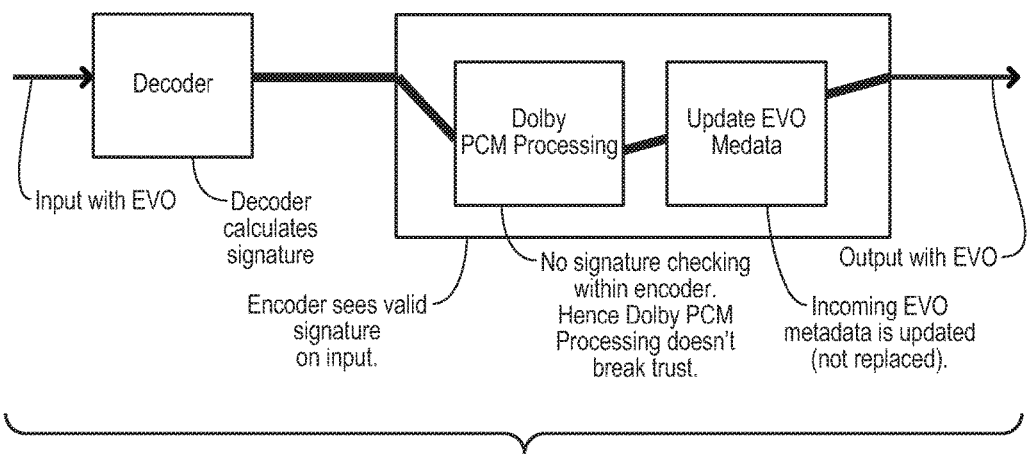

FIG. 6 provides another representation of the transcoders 503, 513, 523 and 533, respectively.

In the present document, methods and systems for transcoding metadata have been described. The methods and systems allow for a transcoding of metadata with a reduced computational complexity. In particular, it is proposed to provide descriptors for blocks of metadata, thereby enabling a transcoder to transcode the metadata based on the descriptors only, without the need of analyzing the actual metadata comprised within a block of metadata. By doing this, the complexity of a transcoder may be significantly reduced. Furthermore, the present document provides methods and systems for protecting metadata frames and for protecting PCM data in a PCM-connected transcoder. As a result, it can be ensured that a receiver of transcoder metadata is provided with an indication of the trustworthiness of the received metadata.

The methods and systems described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the Internet. Typical devices making use of the methods and systems described in the present document are portable electronic devices or other consumer equipment which are used to store and/or render audio signals.

The invention claimed is:

1. An encoding device, comprising one or more hardware elements, configured to generate an encoded bitstream comprising a content frame and an associated metadata frame; wherein the content frame is indicative of a signal encoded according to a first codec system; wherein the encoding device is configured to
   generate a block of metadata;
   insert the block of metadata into the metadata frame;
   select a secure key from a plurality of pre-determined secure keys; wherein a first key of the plurality of pre-determined secure keys provides a first level of trust, and a second key of the plurality of pre-determined secure keys provides a second level of trust that is different from the first level; wherein the first key is a highly secure key known to only to a first set of entities; wherein the second key is a moderately secure key known to a second set of entities which includes the first set of entities;
   generate a cryptographic value based at least on the content frame, on the associated metadata frame and on the selected secure key; and
   insert the generated cryptographic value into the metadata frame.

2. The encoding device of claim 1, wherein the first set of entities includes only the developer of the encoding device, and, in addition to the first set of entities, the second set of entities includes operators of the encoding device plurality of pre-determined secure keys comprises
   a highly secure key known only to a developer of the encoding device; and
   a moderate secure key known to an operator of the encoding device.

3. The encoding device of claim 1, wherein the encoding device is configured to
   generate a plurality of succeeding content frames and associated metadata frames for the encoded bitstream;
   generate a frame cryptographic value based on a single content frame and its associated metadata frame and based on the selected secure key; and
   generate a historic cryptographic value based on at least some of the plurality of succeeding content frames and their associated metadata frames, and based on the selected secure value.

4. The encoding device of claim 1, wherein the encoding device is configured to insert an indication of the selected secure key into the metadata frame.

5. A method for generating an encoded bitstream comprising a content frame and an associated metadata frame; wherein the content frame is indicative of a signal encoded according to a first codec system; wherein the method comprises
   generating a block of metadata;
   inserting the block of metadata into the metadata frame;
   selecting a secure key from a plurality of pre-determined secure keys; wherein a first key of the plurality of pre-determined secure keys provides a first level of trust, and a second key of the plurality of pre-determined secure keys provides a second level of trust that is different from the first level; wherein the first key is a highly secure key known to only to a first set of entities; wherein the second key is a moderately secure key known to a second set of entities which includes the first set of entities;
   generating a cryptographic value based at least on the content frame, on the associated metadata frame and on the selected secure key; and
   inserting the generated cryptographic value into the metadata frame.

6. A decoding device, comprising one or more hardware elements, configured to receive an encoded bitstream comprising a content frame and an associated metadata frame; wherein the content frame is indicative of a signal encoded according to a first codec system; wherein the decoding device is configured to
   extract a cryptographic value from the metadata frame;
   determine a secure key from a plurality of pre-determined secure keys; wherein a first key of the plurality of pre-determined secure keys provides a first level of trust, and the second key of the plurality of secure keys provides a second level of trust that is different from the first level; wherein the first key is a highly secure key known to only to a first set of entities; wherein the second key is a moderately secure key known to a second set of entities which includes the first set of entities;
   generate a verification cryptographic value based at least on the content frame, on the associated metadata frame and on the determined secure key; and
   compare the extracted cryptographic value and the verification cryptographic value to determine whether the received encoded bitstream can be trusted.

7. The decoding device of claim 6, wherein the decoding device is configured to determine the secure key by extracting the secure key from the metadata frame.

8. The decoding device of claim 6, wherein the decoding device is further configured to determine which one of the plurality of pre-determined secure keys has been used to generate the extracted cryptographic value, in order to determine a level of trust of the received encoded bitstream.

9. The decoding device of any of claim 6, wherein the decoding device is configured to
   generate a plurality of verification cryptographic values for the plurality of pre-determined secure keys, respectively;

compare each of the plurality of verification cryptographic values with the extracted cryptographic value; and determine that one of the plurality of pre-determined secure keys has been used to generate the extracted cryptographic value, if one of the plurality of verification cryptographic values matches the extracted cryptographic value.

10. A method for determining a level of trust of a received encoded bitstream comprising a content frame and an associated metadata frame; wherein the content frame is indicative of a signal encoded according to a first codec system; wherein the method comprises extracting a cryptographic value from the metadata frame;
determining a secure key from a plurality of pre-determined secure keys; wherein a first key of the plurality of pre-determined secure keys provides a first level of trust, and a second key of the plurality of pre-determined secure keys provides a second level of trust that is different from the first level; wherein the first key is a highly secure key known to only to a first set of entities; wherein the second key is a moderately secure key known to a second set of entities which includes the first set of entities;
generating a verification cryptographic value based at least on the content frame, on the associated metadata frame and on the determined secure key; and
comparing the extracted cryptographic value and the verification cryptographic value to determine whether the received encoded bitstream can be trusted in accordance to the level of trust of the determined secure key.

11. A transcoding device, comprising one or more hardware elements, configured to transcode an inbound bitstream comprising an inbound content frame and an associated inbound metadata frame into an outbound bitstream; wherein the inbound bitstream is indicative of a set of samples of a signal; wherein the transcoding device comprises a decoder configured to
convert the inbound content frame into a set of decoded Pulse Code Modulated, referred to as PCM, samples of the signal;
extract metadata from the inbound metadata frame;
identify an inbound block of metadata from the inbound metadata frame;
wherein the inbound block of metadata is associated with an inbound descriptor indicative of one or more properties of metadata comprised within the inbound block of metadata, wherein the one or more properties comprise a PCM processing parameter indicative of whether or not the metadata of the inbound block is to be discarded by an encoder, subject to a modification of the set of PCM samples and/or the extracted metadata; and
generate a signature value for the set of decoded PCM samples and the extracted metadata, using a decoder secure key; and
the encoder configured to
receive a set of PCM samples and associated metadata;
receive a signature value;
verify whether the received signature value is valid for the received set of PCM samples and associated metadata, using an encoder secure key; and
generate an outbound content frame of the outbound bitstream from the received set of PCM samples and generate an associated outbound metadata frame of the outbound bitstream from the inbound metadata frame based on the inbound descriptor, if the received signature is valid.

12. The transcoding device of claim 11, wherein the encoder is configured to prevent the insertion of the received metadata into the outbound bitstream, if the received signature is not valid.

13. The transcoding device of claim 11, further comprising a PCM processing stage configured to modify the set of decoded PCM samples and/or the extracted metadata, thereby yielding a set of second PCM samples and second metadata; and
pass the set of second PCM samples and second metadata to the encoder.

14. The transcoding device of claim 13, further comprising a re-signing unit configured to determine an updated signature value for the set of second PCM samples and second metadata, using a re-signing secure key; and
pass the updated signature value to the encoder.

15. The transcoding device of claim 11, wherein the encoder comprises a PCM processing stage configured to modify the set of received PCM samples and/or the received metadata; and
the encoder is configured to generate the outbound content frame and/or the outbound metadata frame based on the modified set of received PCM samples and/or modified received metadata.

16. The transcoding device of claim 11, wherein the encoder is configured to include the metadata of the inbound block into the outbound metadata frame, if the PCM processing parameter indicates that the metadata of the inbound block should not be discarded, even if the set of PCM samples and/or the extracted metadata has been modified.

17. The transcoding device of claim 11, further comprising a PCM processing stage configured to modify the set of decoded PCM samples and/or the extracted metadata, thereby yielding a set of second PCM samples and second metadata; and
pass the set of second PCM samples and second metadata to the encoder, wherein
the PCM processing stage is configured to provide an indication of one or more PCM processing conditions to the encoder;
the one or more PCM processing conditions indicate how the set of PCM samples and/or the extracted metadata has been processed by the PCM processing stage; and
the encoder is configured to generate the outbound metadata frame from the inbound metadata frame also based on the one or more PCM processing conditions.

18. A method for transcoding an inbound bitstream comprising an inbound content frame and an associated inbound metadata frame into an outbound bitstream; wherein the inbound bitstream is indicative of a set of samples of a signal; the method comprising, at a decoder,
converting the inbound content frame into a set of decoded Pulse Code Modulated, referred to as PCM, samples of the signal;
extracting metadata from the inbound metadata frame;
identifying an inbound block of metadata from the inbound metadata frame;
wherein the inbound block of metadata is associated with an inbound descriptor indicative of one or more properties of metadata comprised within the inbound block of metadata, wherein the one or more properties comprise a PCM processing parameter indicative of whether or not the metadata of the inbound block is to be discarded by an encoder, subject to a modification of the set of PCM samples and/or the extracted metadata; and generating a signature value for the set of decoded PCM samples and the extracted metadata, using a decoder secure key;

passing the set of decoded PCM samples, the extracted metadata and the generated signature value to a corresponding encoder; and at the encoder receiving a set of PCM samples and associated metadata;

receiving a signature value;

determining whether the received signature value is valid for the received set of PCM samples and associated metadata, using an encoder secure key; and generating an outbound content frame of the outbound bitstream from the received set of PCM samples and generating an associated outbound metadata frame of the outbound bitstream from the inbound metadata frame based on the inbound descriptor, if the received signature is valid.

* * * * *